(12) United States Patent
Theissen et al.

(10) Patent No.: US 7,653,641 B2
(45) Date of Patent: Jan. 26, 2010

(54) ABSTRACTION CONTROL SOLUTION

(75) Inventors: Mark Theissen, Orange, CA (US);
Robert Kirner, El Segundo, CA (US);
Lawrence White, Santa Monica, CA (US); Andrew Atwal, Redondo Beach, CA (US); Jesus Ortiz, Culver City, CA (US)

(73) Assignee: Accruent, Inc., Santa Monica, CA (US)

( * ) Notice: Subject to any disclaimer, the term of this patent is extended or adjusted under 35 U.S.C. 154(b) by 348 days.

(21) Appl. No.: 10/838,967

(22) Filed: May 4, 2004

(65) Prior Publication Data

US 2005/0251535 A1 Nov. 10, 2005

(51) Int. Cl.
*G06F 17/00* (2006.01)
(52) U.S. Cl. .......................... 707/101; 707/102
(58) Field of Classification Search .................. 707/200
See application file for complete search history.

(56) References Cited

U.S. PATENT DOCUMENTS

| | | | |
|---|---|---|---|
| 4,769,761 A * | 9/1988 | Downes et al. .............. 709/224 |
| 5,440,487 A * | 8/1995 | Althoff et al. ................ 701/43 |
| 5,864,848 A * | 1/1999 | Horvitz et al. ................ 707/6 |
| 6,094,654 A * | 7/2000 | Van Huben et al. ........... 707/8 |
| 6,477,551 B1 * | 11/2002 | Johnson et al. ............. 715/531 |
| 2002/0062368 A1* | 5/2002 | Holtzman et al. ........... 709/224 |
| 2002/0069190 A1* | 6/2002 | Geiselhart ...................... 707/1 |
| 2002/0073235 A1* | 6/2002 | Chen et al. .................. 709/246 |
| 2004/0107202 A1* | 6/2004 | Burdick et al. .............. 707/101 |
| 2004/0107386 A1* | 6/2004 | Burdick et al. ................ 714/38 |
| 2004/0151393 A1* | 8/2004 | Kurauchi .................... 382/239 |
| 2005/0114369 A1* | 5/2005 | Gould et al. ................ 707/100 |

* cited by examiner

*Primary Examiner*—Shahid A Alam
*Assistant Examiner*—Nirav K Khakhar
(74) *Attorney, Agent, or Firm*—Townsend and Townsend and Crew

(57) ABSTRACT

A scaleable abstraction control solution including an abstraction process and an abstraction system. The abstraction solution permits extraction, tracking, and management of data defined in one or more documents. The abstraction process can include double blind data abstraction. The abstracted data can be verified using a quality assurance process that can include statistical sampling, tracked random error insertion, and abstraction auditing. Data from documents can be abstracted into one or more customizable databases, forms, templates, or software.

23 Claims, 14 Drawing Sheets

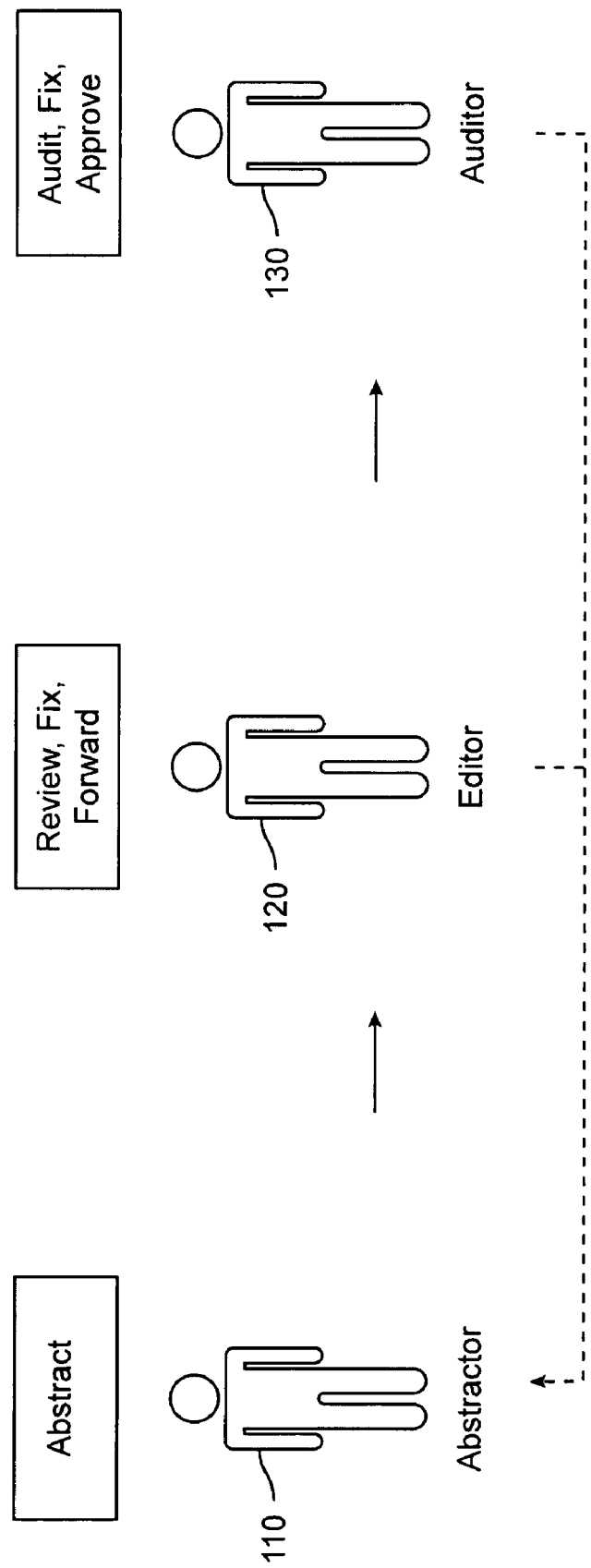

ABSTRACTION CONTROL SOLUTION

BACKGROUND OF THE DISCLOSURE

The sheer number and complexity of contracts that a company may enter into results in difficulties in contract management. Large companies may have between 10,000 and 40,000 active contracts. Because these contracts are typically scattered throughout an organization within filing cabinets and individual computers, the business-critical information contained in the contracts, such as payment terms, renewal clauses, liabilities, etc., are hidden from view.

Some of the biggest barriers to successful implementations of contract management solutions are data availability and data quality. For a contract management solution to be effective, the content of paper and computer-based documents must be converted into useable, consistent digitized data. Contract managers typically gather this critical contract data through the difficult and time-consuming process of data conversion and extraction.

Data conversion, or the process of extracting existing data from other applications and converting it into a useable format, is important because certain types of data are more accurate when pulled from applications. However, data conversion alone falls short of the rich data fields that are created during the data extraction process.

Data abstraction is the process of extracting or summarizing key data from contracts and converting the data into consistent electronic formats. This data can be stored in a centralized data repository (application database) where it can be accessed by a contract management solution. Data abstraction focuses on both the quantitative and qualitative information contained in contracts. Quantitative information, data with measurable terms, is essential to the execution and management of contracts. This information can include items such as payment terms, renewal clauses, liabilities, discounts and other incentives, chargeback terms and revenue recognition. Qualitative information, or data about the specific elements of a contract, can be essential to understanding the contract as a whole and can include items such as critical issues, key clauses, responsibilities, and descriptive information about quantitative fields.

By extracting and consolidating key information from contracts, companies are able to build a comprehensive view of all the contractual obligations that drive their operations and spending. Because data abstraction is a difficult process involving high degrees of complexity, and because a company may have large numbers of contracts, few companies or system implementers are equipped to handle the job.

BRIEF SUMMARY OF THE DISCLOSURE

A scaleable abstraction control solution including an abstraction process and an abstraction system is disclosed. The abstraction solution permits extraction, tracking, and management of data defined in one or more documents. The abstraction process can include double blind data abstraction. The abstracted data can be verified using a quality assurance process that can include statistical sampling, tracked random error insertion, and abstraction auditing. Data from documents can be abstracted into one or more customizable databases, forms, templates, or software.

In one aspect, the disclosure includes a method of data abstraction. The method including abstracting data from a document using a double blind abstraction to create a plurality of abstraction instances having abstracted data, comparing at least two of the plurality of abstraction instances for a predetermined compliance threshold; and releasing an abstraction instance having at least one abstraction value.

In another aspect, the disclosure includes a method of data abstraction, where the method includes receiving a plurality of abstraction instances from a double blind abstraction of a document, comparing at least two of the abstraction instances to determine a number of compliance errors, and rejecting the compared abstraction instances if the number of compliance errors exceeds a predetermined compliance threshold. The method further includes resolving compliance errors in one of the compared abstraction instances if the number of compliance errors does not exceed the predetermined compliance threshold, generating an abstraction value from one of the compared abstraction instances, inserting at least one error in a known location of the abstraction instance, validating abstracted data in the abstraction instance, and releasing an abstraction instance having at least one abstraction value.

In still another aspect, the disclosure includes one or more processor readable storage devices having stored therein one or more processor readable instructions, one or more processors executing the one or more processor readable instructions configured to perform a method. The method includes receiving a plurality of abstraction instances from a double blind abstraction of a document, comparing at least two of the abstraction instances to determine a number of compliance errors, rejecting the compared abstraction instances if the number of compliance errors exceeds a predetermined compliance threshold, receiving an abstraction instance having at least a portion of the compliance errors resolved if the number of compliance errors does not exceed the predetermined compliance threshold, inserting at least one error in a known location of the abstraction instance, receiving a validated abstraction instance, and releasing an abstraction instance having at least one validated abstraction value.

In still another aspect, the disclosure includes a data abstraction system. The system includes a compliance engine configured to receive a first abstraction instance and a second abstraction instance, and configured to compare the compare the first abstraction instance to the second abstraction instance and reject the abstraction instances if a number of compliance errors exceeds a predetermined threshold, a quality assurance module configured to receive an abstraction value based in part on the first and second abstraction instances, and further configured to insert a number of abstraction errors into the abstraction instance to create a mined abstraction instance, and a validation module configured to receive an audited abstraction instance based in part on the mined abstraction instance, and further configured to release the audited abstraction instance based in part on a number of corrected abstraction errors in the audited abstraction instance.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

FIG. 1 is a functional diagram of an abstraction flow process of the present disclosure.

DETAILED DESCRIPTION OF THE DISCLOSURE

Figure 2A:
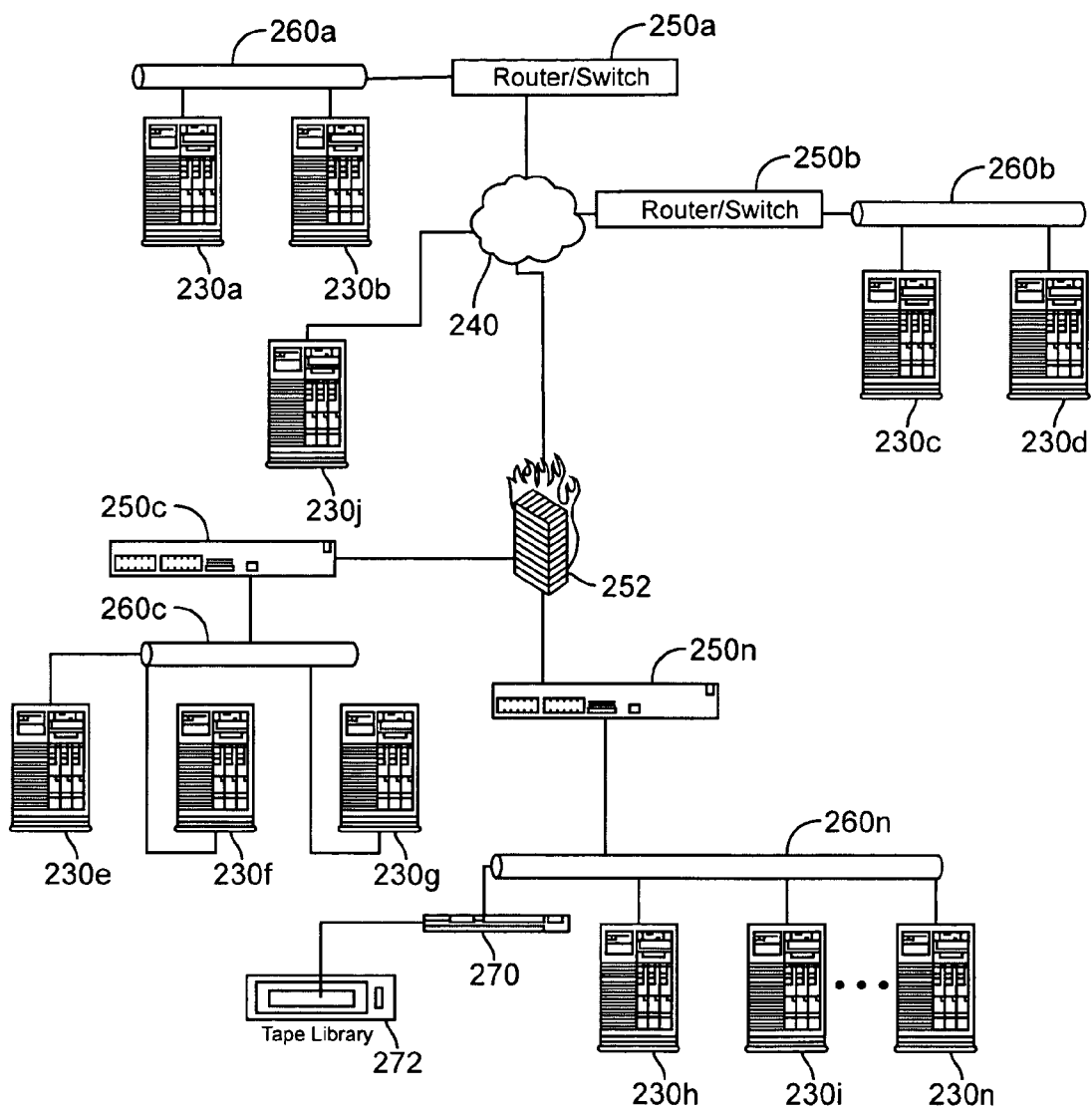
FIG. 2A is a functional block diagram of an abstraction system of the present disclosure implemented as a networked computer system.

The concept of abstraction, in accordance with its ordinary meaning and as used herein, includes at least the extracting of information from a document or image of a document. For example, abstraction can refer to the extraction of contractual information for use with a database, form, template, or software.

The following disclosure is directed to an abstraction system and abstraction processes that may be implemented within an abstraction system. The abstraction system can be used to extract, for example, key terms, dates, requirements, payments, schedules, and language from a document, such as a contract. Once the data is abstracted, the various contractual terms may be more efficiently managed, such as by using a software contract management solution.

Although the description is directed to an abstraction system used to extract contractual terms from a document, the abstraction system may be applicable to any type of document or source of information. The information provided to the abstraction system need not originate as a document, but may be any source of information, including, but not limited to, electronic data, visual data, audio data, mechanical data, and the like, or some combination of data source types.

Additionally, although the accompanying figures and description may describe the abstraction system as comprising a number of modules, some or all of the functionality of the various modules may be combined into different modules, or a module may comprise a number of sub-modules. Each module may also be implemented either partially or wholly as software embodied on one or more processor readable storage devices and executed by one or more processors.

FIG. 1 is a functional diagram of an abstraction flow process 100 that can be performed by an abstraction system, as will be described in further detail below. The abstraction system can initially perform abstraction using an abstractor 110. Data from an information source is extracted and entered in to a desired abstraction database.

The abstractor 110 can use, for example, manual, automated, or combination of manual and automated processes to perform initial data abstraction. For example, manual abstraction of data from a non-standardized or unique information source may be advantageous over constructing an automated process that will only be used for a single abstraction from a single information source. Although almost all data abstraction can be performed using an automated process, the effort in automating the data abstraction process may surpass the effort required to perform manual data abstraction. As an example, it may be advantageous to perform manual abstraction of data from a visual source, such as a piece of artwork, or from a mechanical source, such as an archeological artifact.

Alternatively, automated extraction of data from standardized electronic information sources may be advantageous over manual extraction of data from the electronic sources. As an example, it may be advantageous to perform fully automated abstraction of data from electronic files that are generated from standardized forms having defined data fields. Additionally, the text of many documents can be converted to electronic format using an automated technique, such as optical character recognition (OCR). In other instances, it may be advantageous to perform a combination of manual and automated data abstraction.

The abstractors 110 typically extracts data into a database to facilitate automated processing by subsequent processes and modules within the abstraction system. The abstraction system communicates the abstracted data to an editor 120.

In the event two or more abstractions instances are different, the editor 120 reviews the initial data abstractions performed by the abstractors 110. The editor 120 can review only the differences in the work performed by the abstractors 110 and accept the work of one of the abstractors over another. As in the case of the abstractors 110, some or all of the functions of the editor 120 may be automated. The editor 120 can return the abstracted data to the abstractors 110 if the abstracted data is deemed unsatisfactory. The editor 120 may determine that the abstracted data unsatisfactory if, for example, the editor 120 detects a high number of data abstraction errors, or if the editor 120 determines that the data abstraction is incomplete. Upon editor 120 approval, the abstraction systems communicates the abstracted data to an auditor 130.

The auditor 130 can further review the data abstraction and can provide quality assurance validation of the initial data extracted by the abstractors 110 as well as the decisions made by the editor 120. Some or all of the functions of the auditor 130 may be automated. The auditor 130 may return the abstracted data to the editor 120 or the abstractors 110 if the auditor determines the abstracted data is not satisfactory. The auditor 130 may also approve the abstracted data for final release.

The act of communicating abstracted data or returning abstracted data between the various actors can include physical communication of the abstracted data, electronic communication of the abstracted data, or communication of a pointer, flag, or indicator associated with the abstracted data. When the different actors are remote from one another, it may be advantageous to communicate an electronic copy of the abstracted data. Alternatively, in a networked system, it may be advantageous to communicate an indicator or flag associated with the abstracted data. Thus, in one embodiment, the abstracted data may be stored in a centralized storage, and the editor 120 can return abstracted data to an abstractor 110 by setting an indicator or flag that assigns the abstracted data to the abstractor 110. Similarly, an editor 120 can communicate abstracted data to an auditor 130 by setting an indicator or flag that assigns the abstracted data to the auditor 130.

FIG. 2A is a high level functional block diagram of an embodiment of an abstraction system 200. The system 200 can include a plurality of sub-networks and devices interconnected via a network 240. The abstraction system 200 can be implemented on one of the communication devices, for example 230h, or can be distributed across numerous communication devices, for example 230a-230n.

The network 252 can include a wired network, a wireless network, a Local Area Network (LAN), Metropolitan Area Network (MAN), Wide Area Network (WAN), and the like, or some other manner of linking communications. In one embodiment, the network 240 is the Internet.

Each of the sub-networks, for example first sub-network 260a can include a router or switch 250a that interconnects communication devices, 230a and 230b, within the sub-network 260a with the network 240. Thus, although only four sub-networks 250a-250n are shown in FIG. 2A, any number of sub-networks 250a-250n may be communicatively coupled using the network 240.

A second sub-network 260b may similarly include a router or switch 250b that couples the second network 260b to the network 240. One or more communication devices 230c and 230d may communicate with the network 240 using the second sub-network 260b.

A third sub-network 260c may communicate with the network 240 via a network firewall 252. A switch 250c may couple the third sub-network 260c to the network firewall 252, and to the network 240. Various communication devices 230e-230f can be coupled to the third sub-network 260c and can communicate with each other as well as other communication devices coupled to the network 240.

An n-th sub-network 260n can also be coupled to the network 240. In the embodiment shown in FIG. 2A, the n-th sub-network 260n is coupled to a switch 250n that connects to the network 240 via the same network firewall 252 used by the third sub-network 260c. The n-th sub-network 260n can include a number of communication devices 230h-230n. Additionally, each of the sub-networks 260a-260n can include additional devices. For example, the n-th sub-network 260n can include a controller 270 configured to operate a tape library 272 or some other storage devices, such as hard drives, optical disks, or RAID storage devices.

A stand alone communication device 230j can couple to the network 240 via some network connection, and does not need to be part of a sub-network. The stand alone communication device 230j can connect to the network 240, for example, using an Internet connection provided by an Internet Service Provider (ISP).

The various communication devices 230a-230n can be the same types of communication device or can be distinct types of communication devices. For example, communication devices in a sub-network, for example 260n, configured to implement a majority of the functionality of the abstraction system 200 may include servers or computers configured to operate as hosts.

Communication devices such as 230a-230b coupled to a sub-network 260a that has reduced functionality within the abstraction system 200 may include computers that are configured to operate as clients to hosts or servers within another part of the system. The communication devices 230a-230n are not required to be computers, but may be any type of communication device. For example, a communication device can be a server, a computer, a personal computer, a personal digital assistant, a terminal, a special purpose communication device, a telephone, a wireless telephone, and the like, or some other communication device.

In one embodiment, the abstraction system 200 is configured as a client server system using a JAVA 2 Platform, Enterprise Edition (J2EE) based architecture. One or more of the servers, for example 230f, can be configured as a MICROSOFT WINDOWS 2000 server. Another server, for example 230g. can be configured as a SQL server. Alternatively, one or more servers may be configured as a JBOSS application server, a Lightweight Directory Access Protocol (LDAP) server, or some other server. The software used to implement particular functionality within the abstraction system 200 can depend on the function performed by the server. Additionally, a server or communication device may concurrently implement one or more software applications. For example, a computer, for example 230a, configured as a client may implement a web browser or similar software. The web browser software may be configured to interface with DHTML and JAVA applications.

Figure 2B:
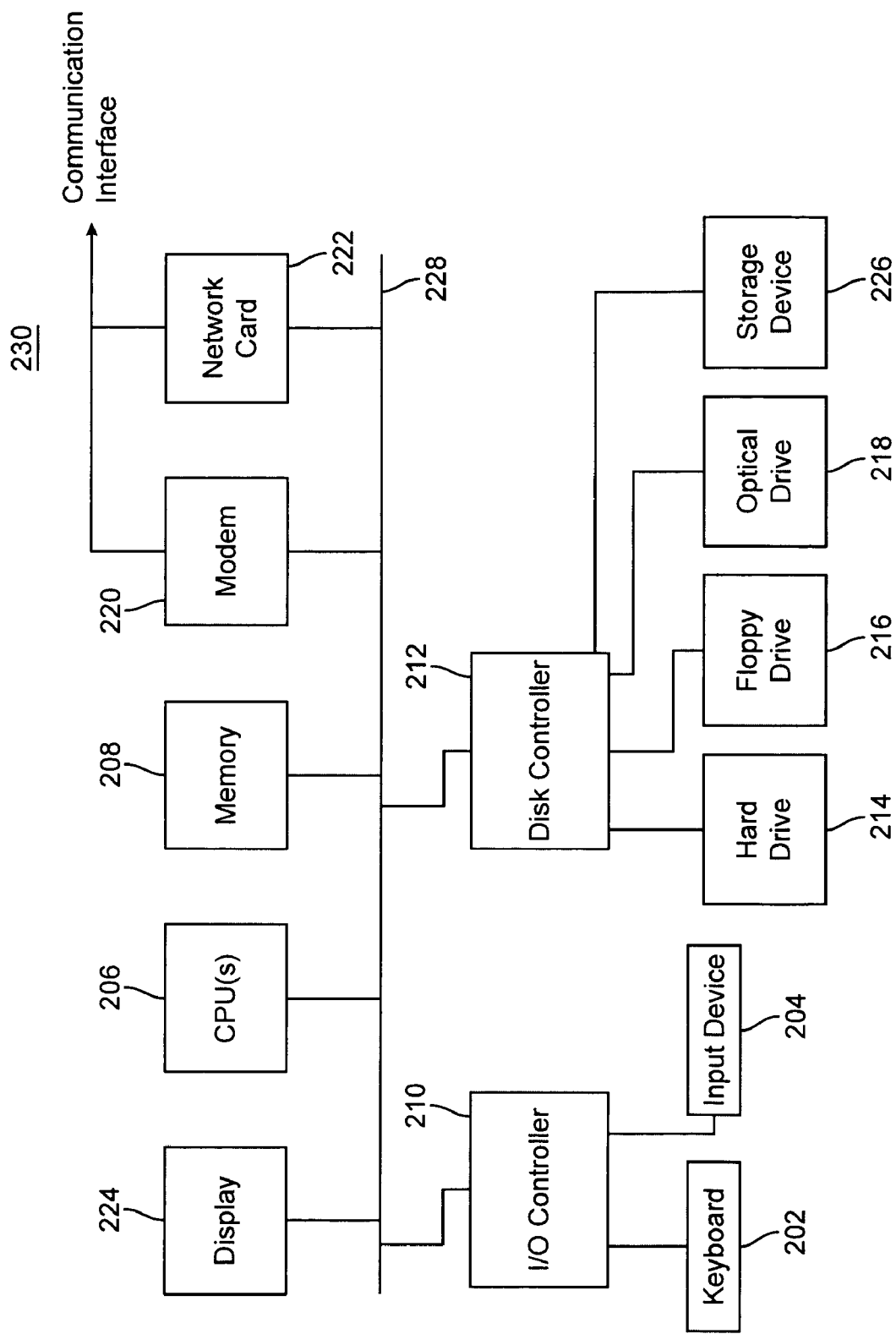
FIG. 2B is a functional block diagram of a computer that may be used in the network of FIG. 2A.

FIG. 2B is a functional block diagram of a computer 230 that can be one of the communication devices shown in FIG. 2A. The computer 230 can include a display 224, a keyboard 202, an input device 204, a processor 206, memory 208, an I/O controller 210, a disk controller 212, a hard drive 214, one or more removable storage drives, which can include a floppy drive 216 and an optical drive 218, modem 220, a network interface card (NIC) 222, and one or more storage devices 226. The various elements can be coupled using one or more computer busses 228 within the computer 230. The one or more storage devices 226 can include, but are not limited to, ROM, RAM, non-volatile RAM, flash memory, magnetic storage, optical storage, tape storage, hard disk storage, and the like, or some other form of processor readable medium.

The memory 208 and the storage devices 226 can include one or more processor readable instructions stored as software. The software can be configured to direct the processor 206 to perform some or all of the functions within the abstraction system 200. The software can include stand alone software executed by the processor 206, or the software can run within an operating system, or within another software program.

Figure 2C:
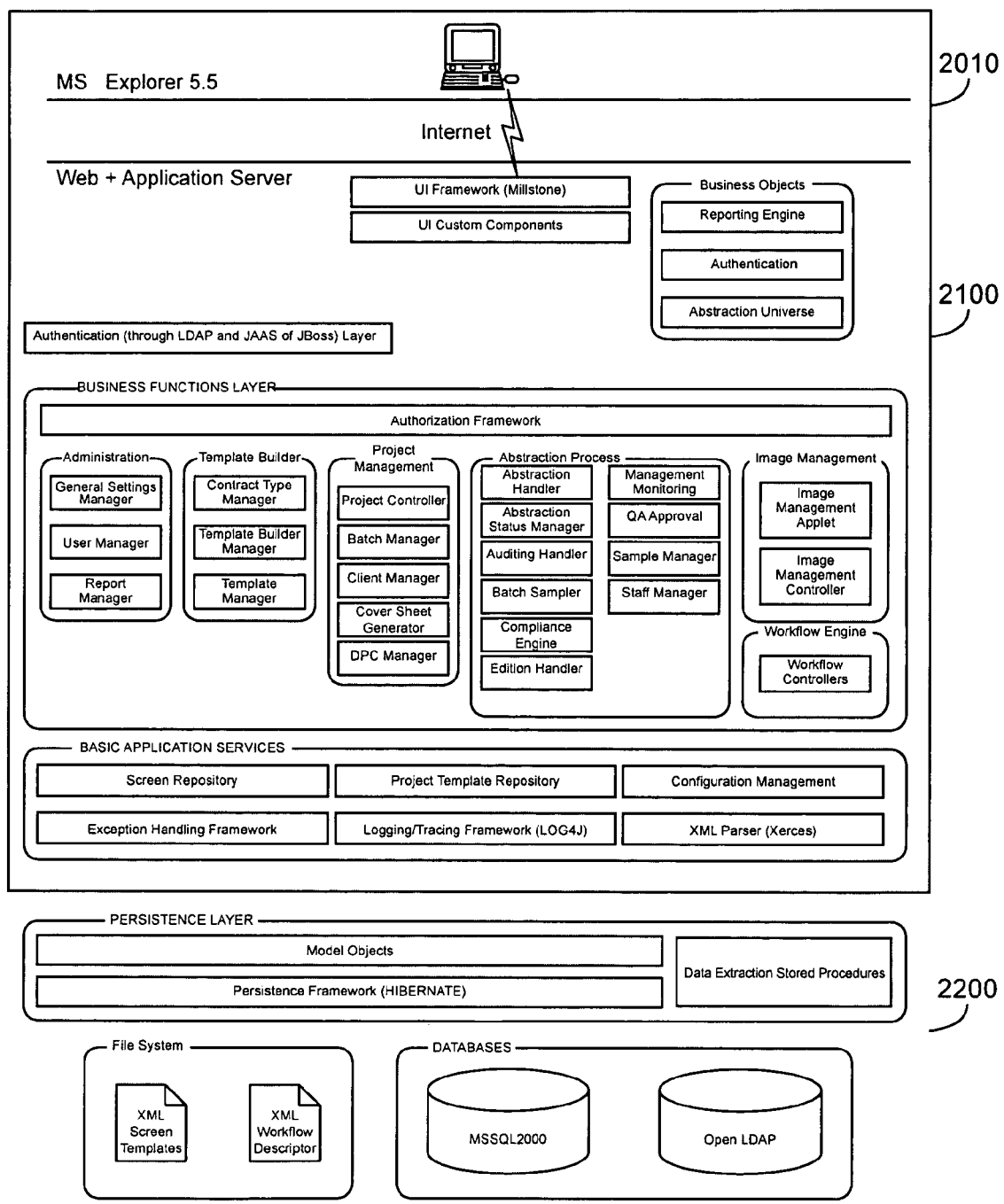
FIG. 2C is a functional block diagram of a software architecture embodiment that can be implemented in one or more of computers of an abstraction system.

FIG. 2C is a functional block diagram of a software architecture 2000 embodiment that can be implemented in one or more computers of an abstraction system. The software architecture 2000 can be, for example, implemented in the abstraction system 200 of FIG. 2A. One or more of the modules of the software architecture 2000 can be implemented, for example, as processor readable instructions stored in memory or storage device of a computer, such as the computer 230 shown in FIG. 2B.

The abstraction system software architecture 200 can be described in three basic layers. The three layers can be described as a presentation layer 2010, a business services layer 2100, and a model layer 2200.

A presentation layer 2010 can include the software modules that interface the system to a user. The architecture can interface with, for example, an Internet browser such as INTERNET EXPLORER browser or some other Internet browser. Additionally, user interface framework modules and user interface components may form a part of the presentation layer 2010.

The business services layer 2100 can include the majority of the modules that are implemented in the software architecture 2000. The business services layer 2100 can itself be divided into one or more general functions. The business services layer 2100 can include, for example an authentication layer, a business functions layer, and at least a portion of a business objects layer that can interface the business services layer 2100 with the presentation layer 2010. The business services layer 2100 can include, for example modules for administration, template building, project management, abstraction, and image management.

The administration module can include modules that operate as managers. For example a general settings manager can be used to manage and support settings, such as administrative access and other parameters that may be used globally within the system. A user manager and report manager can also be implemented within the administration module.

The template builder can include modules that manage processes and tasks associated with building a customized abstraction template. The modules can include, for example, a contract type manager, a template builder manager, and a template manager. The contract type manager can track, for example parameters that may be associated with a particular type of contract. For example, a real estate lease contract may include a range of typically associated fields. In contrast, other types of contracts may typically include fields that are generally excluded from a real estate lease contract. The template builder manager can manage the generation of a customized abstraction template to meet the needs of any target application or data repository. The template manager can manage the abstraction template that is built using the template builder.

A project management module can include, for example, project controller, batch manager, client manager, cover sheet generator, and document processing center manager modules. Each of the modules can be configured to facilitate management of the particular project portion to which it corresponds.

An abstraction process manager can include such modules as an abstraction handler, an abstraction status manager, an auditing handler, a batch sampler, a compliance engine, an edition handler, a management monitor, a QA approval module, a sample manager, and a staff manager. An image management module can support management of images, such as images of incoming documents that will be abstracted. The image management module can include an image management applet and an image management controller.

The business services layer 2100 can also include modules configured to provide basic application services. These modules can include, for example, a screen repository, a project template repository, a configuration management module, an exception handling framework, a logging and tracing framework, and an XML parser.

The model layer 2200 can include modules for model objects, a model framework, and a data extraction module. Also included in the model layer 200 can be a file system module and one or more databases.

The file system module can include, for example, XML screen templates and XML workflow descriptors. The data extraction module can include one or more procedures configured for data extraction, such as for extraction of data from the databases to combine with one or more objects from the model objects.

The databases can be any type of database that can be implemented within the software architecture 2000. For example, the databases can include Structured Query Language (SQL) databases and Open Lightweight Directory Access Protocol (LDAP) databases, and the like, or some other structure for storing data.

Figure 3:
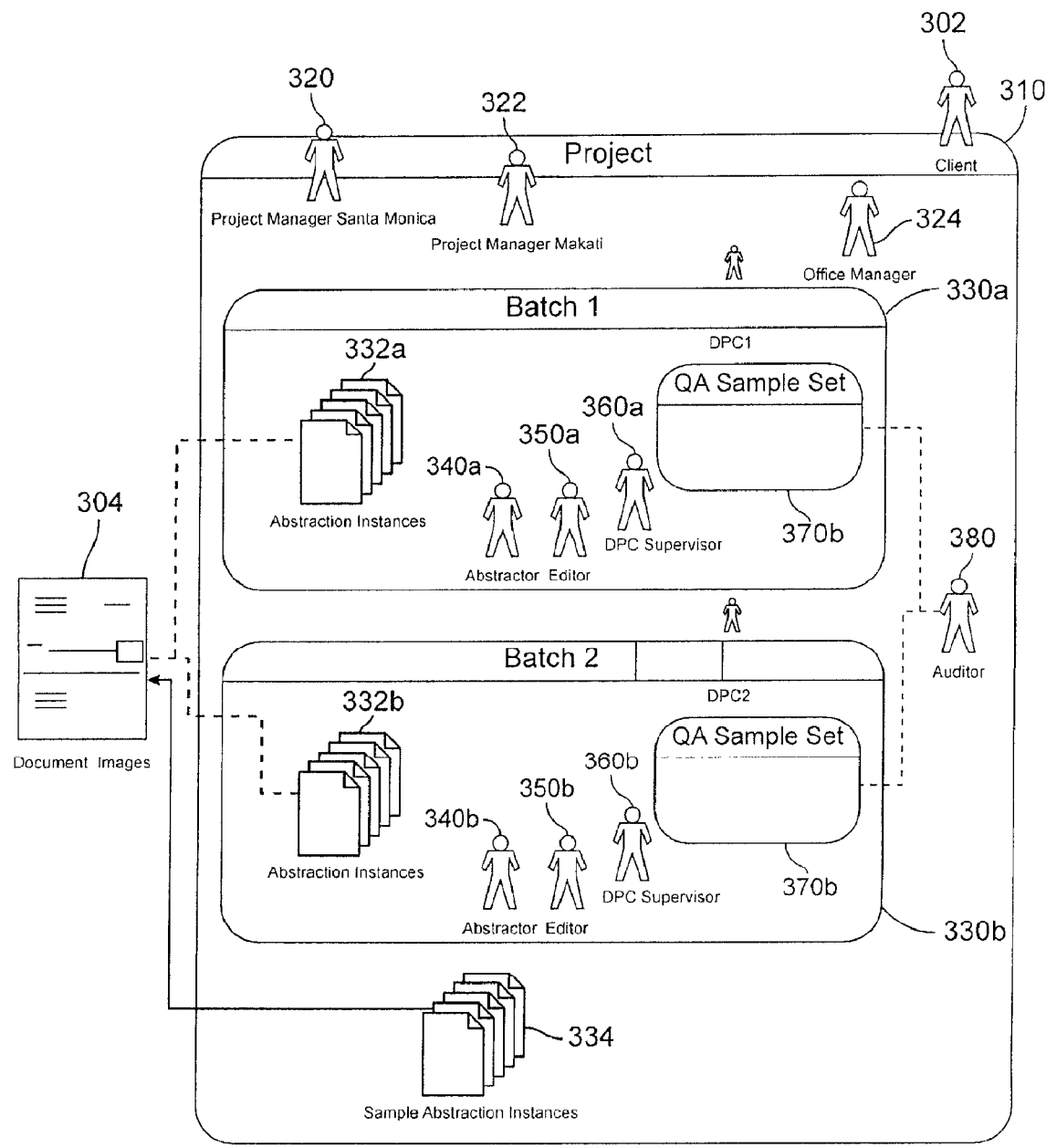
FIG. 3 is a concept model of entities of one embodiment of the abstraction system of the present disclosure.

FIG. 3 is a concept model 300 of entities of one embodiment of the abstraction system of the present disclosure. Within the concept model 300 a client 302 initiates an abstraction project 310 by requesting abstraction of one or more documents 304. One or more project managers 320, 322 may be assigned within a project 310. It may be advantageous to have more than one project manager, for example 320, when the project 310 is distributed over a plurality of remote locations.

A project manager 320 parse the document images 304 into one or more batches. The project 310 can be divided into many batches and transmitted to separate Data Processing Centers 330a and 330b. Document images in a batch are typically abstracted by the same Document Processing Center (DPC), for example 330a. There can be many batches in the project 310 and furthermore one DPC may have more than one batch in a project 310. The project manager 320 can interface with one or more data processing centers 330a and 330b that are assigned to abstract data from the one or more batches. The client 302 and project manager 320 can jointly set-up a customized form, also referred to as an abstraction template, to reflect the data to be abstracted for a specific document type. An office manager 324 can also interface with the client 302 for purposes such as billing scheduling, etc.

One or more of the DPCs 330a and 330b may generate sample abstraction instances 334. The sample abstraction instances 334 can be generated from portions of two or more sample contracts. The sample contracts can be abstracted and formatted according to the abstraction template for the client 302. The client 302 can verify previous selections and requirements for accuracy and suitability.

Once the sample abstract is completed and the abstracted sample data is transformed to the target database, the client can review the abstracted information in detail and provide an acknowledgement authorizing the remainder of the abstraction process.

Each DPC, for example 330a can include one or more abstractors 340a that generate one or more abstraction instances from the document 304 supplied by the client 302. In one embodiment, at least two abstraction instances are generated using double blind abstraction.

An editor 350 operates on the abstraction instances using the editor screens of the application (not shown). Alternatively, a compliance engine may independently operate on the abstraction instances before transferring the abstraction instances to the editor 350a. The editor 350a, using the editor screens of the application, can compare two abstraction instances and can further review the files and perform edits if the compliance engine determines there are differences between the two abstracts. For those abstractions that have failed the compliance check, the editor 350a can select the correct values from one of the abstractions of the double blind entry. If the editor 350a can correct all differences, then the abstraction will be sent to the audit queue. If no differences are found by the compliance engine, or if the editor 350a is able to correct differences, then a merged abstraction instance 332a can be generated based in part on at least one of the abstraction instances. The abstraction value 332a can be queued for quality assurance performed by an auditor 380.

When abstraction for a batch is complete and at least one abstraction value 332a has been generated, the quality assurance (QA) process can start. This process is performed by one or more auditors 380 who review a randomly selected set of abstracts from a given batch. The randomly selected set of abstracts can define a QA sample set 370a.

The auditors 380 search the abstraction values in the QA sample set 370a for undiscovered abstraction errors. The auditors 380 can also discover and correct artificially inserted errors in the abstracts called mines, also referred to as data mines. The auditors 380 can release the abstracted document based on a predetermined quality threshold. The work of each particular auditor 380 can also be verified by one or more additional auditors 380. For example, if the ratio of errors found or missed by the auditors exceeds the error threshold then the abstraction fails QA and is directed to a cleaning room (not shown) where a manager, such as the program manager 320 decides what further actions to take. If the abstraction passes QA then it will be ready for release.

This process above may occur in parallel for several batches of the project. For example, a second batch may be processed by a second DPC 330b having one or more abstractors 340b and one or more editors 350b generating one or more abstraction instances 332b and abstraction values from the document 304. A QA sample set 370b can be generated from the one or more abstraction values. The auditor 380 can similarly review and correct the abstraction values from the QA sample set 370b.

When abstraction instances in a batch are fully completed, the project director can release the batch. A release can mean that the status and content of the released batch will not be further changed. When all batches of the project are released, an abstraction instance database (built by a Data Extraction Tool) can be fully delivered to the client.

Figure 4:
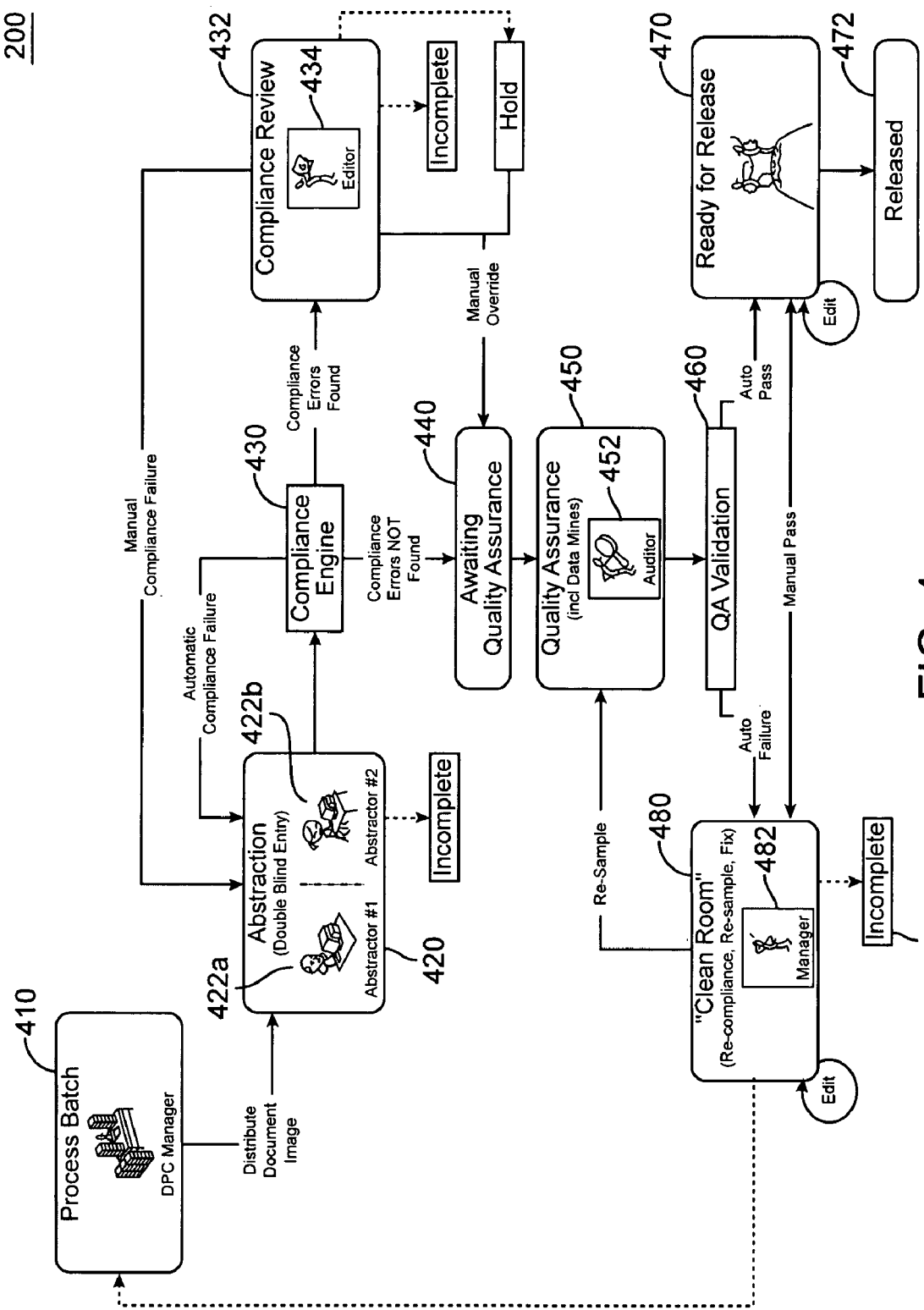
FIG. 4 is a functional block diagram of an abstraction system workflow of the present disclosure.

FIG. 4 is a detailed functional block diagram of an abstraction system 200. The abstraction system 200 of FIG. 4 may be the abstraction system shown in FIG. 2A. However, the abstraction system 200 of FIG. 4 is depicted in functional blocks to show the work flow rather than as the hardware configured to perform the functional blocks.

The abstraction system 200 includes a batch processor 410. The batch processor 410 can perform the batch parsing and setting of configurable variables not already performed by the project manager. The batch processor 410 can also organize the batch as multiple images or files to be abstracted. The batch processor 410 can, for example, control the abstraction module 420 assigned to a particular file or portion of the assigned batch. The batch processor 410 can distribute the files or documents to be abstracted to one or more abstraction modules 420.

Each document or file to be abstracted can preferably be abstracted using double blind data abstraction. In double blind data abstraction, the document can be provided to at least two abstractors 422a and 422b. The term double blind can refer to a process in which neither the abstractors 422a and 422b knows which abstractors 422a and 422b are performing the data abstraction. Performing data abstraction in a double-blind fashion can lessen the influence of prejudices, unintentional interaction of the abstractors 422a and 422b, improve accuracy and consistency in the abstracted result.

Alternatively, the term double blind may refer to the situation where the multiple abstractors 422a and 422b operate independently and without knowledge of the abstraction performed by the others. The data abstraction remains double blind because the batch processor's 410 knowledge of abstractors 422a and 422b typically has no effect on the data abstraction performed by the abstractors 422a and 422b.

Double blind abstraction can result in multiple abstraction instances corresponding to the same input document. Thus data abstraction by two independent abstractors 422a and 422b can result in two independent abstraction instances corresponding to the same input document.

It may be advantageous to perform abstraction using two abstractors 422a and 422b. There is typically no significant improvement gained by performing greater than two parallel abstractions. Additionally, while the double blind data abstractions may occur concurrently, such concurrent abstraction is not a requirement and double blind abstraction may occur simultaneously, concurrently, serially, or a combination of concurrent and independent abstractions.

Each abstractor, for example 422a, can perform abstraction by extracting information and data from the input document to populate fields within an abstraction template. The multiple abstractors 422a and 422b can both use copies of the same document and abstraction template.

The abstractors 422a and 422b can perform data abstraction using a manual, process. In one embodiment, an abstractor, for example 422a, includes an individual that manually performs data abstraction by reviewing the input document for relevant information and data and entering the relevant information or data in a field of an abstraction template. The abstractor 422a can provide the relevant information or data, for example, to an electronic form of the abstraction template. Thus, the abstractor 422a can perform manual data entry into an electronic form.

In another embodiment, an abstractor, for example 422a, performs data abstraction using a combination of manual and automated processing. An operator can review an image of the input document and flag, mark, or otherwise identify relevant data to be extracted into an associated abstraction template. An associated automated process, such as a document scanner, or a software process configured to extract the identified data can be used to extract relevant data and information based in part on the flags, marks, or identification provided by the operator. The associated automated process can populate the abstraction template based in part on the operator inputs. The associated automated process can thus work in conjunction with the operator inputs to extract the relevant data and populate the abstraction template.

In still another embodiment, the abstractor 422a can be automated and can operate relatively free of operator input. In such an embodiment, an operator or process can provide a copy of the input document to the abstractor 422a and the abstractor can automatically extract the relevant data and information to the corresponding fields of the abstraction template. Automated abstraction may be advantageous where the input is in a structured format, or where numerous documents having the same, or substantially the same format are abstracted. The abstractor 422a can be configured to extract relevant data and information based on a set of rules, formulas, or criteria applied to the input document. When automated double blind abstraction is performed, it may be advantageous to use abstractors 422a and 422b having at least one different abstraction rule, formula, or criterion such that the multiple data abstractions are not perfectly correlated.

The multiple abstractors 422a and 422b can both use the same extraction technique, or may use different abstraction techniques.

Regardless of the method in which the abstractors 422a and 422b extract data into the abstraction template, the abstractors 422a and 422b, communicate the abstracted data to a compliance engine 430.

The compliance engine 430 can be configured to determine or otherwise calculate a compliance value and can make a decision based on the results. For example, the compliance engine 430 can be configured to compare the abstraction values in the fellow abstraction instances, identify the mismatches, flag or otherwise note a location or field of the mismatches, and count the number of mismatches. In one embodiment, the outcome of compliance may be one of a predetermined number of outcomes.

In a first condition all of the abstraction values in the fellow abstraction instances match. In this condition, the independent data abstractions resulted in the same data being extracted for each field. Thus, there is a high confidence level that the abstracted data is accurate. One of the abstraction instances can be sent to the Waiting for QA module 440.

In a second condition, the abstraction values in the fellow abstraction instances do not match completely. However, the compliance engine 430 may not immediately reject the abstraction instances because the number of mismatches may be sufficiently small that the compliance engine 430 can assume that one or more editors can make the corrections. For example, the number of mismatches may be less than a predetermined compliance threshold but greater than zero, or some predetermined pass criteria. The abstraction instances or particular abstraction values may be flagged as having failed compliance. The compliance engine 430 can set, for example, a flag or indicator identifying the abstraction instances as compliance failed.

In a third condition, the abstraction values in the fellow abstraction instances do not match and the number of mismatches is greater than or equal to the predetermined compliance threshold. Alternatively, the compliance engine 430 may determine that there is a file corruption.

The compliance engine 430 can determine a file corruption if the number of mismatches is greater than a predetermined corruption threshold. The predetermined corruption threshold may be, for example 85% of the total number of abstraction values in an abstraction instance. The compliance engine 430 may use additional criteria in determining whether a file corruption occurred. For example, the compliance engine may determine corrupted files if errors in consecutive repeating forms exceed the predetermined corruption threshold. Thus, the compliance engine 430 may determine file corruption even if the total number of abstraction errors is less than a predetermined corruption threshold percentage. Additionally, the compliance engine 430 may determine a file corruption if a number of repeating forms appearing in the abstraction templates of the two abstraction instances are not the same.

The compliance engine 430 rejects the abstraction instances due to the high number of mismatches or the file corruption. The compliance engine 430 can set a flag or indicator identifying the abstraction instances as rejected or failed by compliance.

Additionally, when a "corrupt" abstraction value pair is encountered, the compliance engine 430 can post a general note indicating that the system discovered one or more repeating form errors. The compliance engine 430 may also post potential reasons or possible causes for the form errors, including an out of order condition, a missed item, or an extra item. The compliance engine 430 may add a note to prompt a user to review the abstraction values and resubmit the files.

The compliance engine 430 can be configured to return the abstraction instances to the originating abstractors 422a and 422b if the abstraction instances are flagged as having failed compliance. The abstractors 422a and 422b can then re-abstract the document and communicate revised abstraction instances to the compliance engine 430 for analysis. If the compliance engine 430 determines that re-abstracted abstraction instances continue to fail the compliance criteria, the compliance engine 430 can reject the abstraction instances and flag the instances for review by a supervisor, such as the DPC supervisor, e.g. 360a or 360b from FIG. 3, or the project manager.

The compliance engine 430 can direct the abstraction instances to a compliance review module 432 if the number of abstraction value mismatches is less than the compliance threshold. The compliance review module 432 is configured to perform editing of the abstraction instances to correct the mismatches.

The compliance engine430 identifies some differences between the double-blind entry process abstractions and forwards the abstraction instances to the compliance review module 432. In the compliance review module 432, an editor 434 examines the mismatches and differences, and determines the field value based on one of the abstraction values. Alternatively, the editor 434 can mark the mismatch as an error. In one embodiment, the editor 434 can only choose between one of the abstraction values in the abstraction instances. The editor 434 is not able to directly change the abstraction in a free form way.

As with the abstraction module 420, one or more of the functions within the compliance review module 432 can be performed manually, automatically, or with a combination of manual and automatic processes. An editor 434 can perform editing functions within the compliance review module 432. The editor 434 can be, for example, the editor 120 shown in the overview of FIG. 1.

In one embodiment, the editing function within the compliance review module 432 can be performed manually by an editor 434. In another embodiment, the editor 434 is a module that performs the editing function automatically by receiving electronic copies of the input document and fellow abstraction instances. The editor 434 can be, for example, a software function that performs the editing function based on a number processor readable instructions defining a number of criteria, processes, and operations. In still another embodiment, the editor 434 includes a combination of manual and automated processes. For example, an automated process, such as a software process running on a computer, can prompt an operator with a mismatched field and request the operator enter a value. The automated process can verify the entered value against the abstraction values in the fellow abstraction instances and determine which of the abstraction values is a correct field value. Thus, the editing functions described below can be performed using a number of manual and automated variations.

The editor 434 can review mismatched fields in the abstraction instances and can also view the original input document. The editor 434 can see, for example, a list of these differences and can choose one of the fields, if the editor 434 determines that the filed value is correct. To start an edit process on an abstraction instance, the abstraction instances can be selected by the editor 434 from an assignment list.

When viewing abstraction values abstracted from the same document image, the editor 434 can go through the mismatches and annotate them. The editor 434 typically cannot submit the edited abstraction instances until all mismatches have been resolved. The editor 434 can navigate among the mismatches using 'next error' or 'previous error' buttons or the editor 434 can directly jump to a field pair that did not match. When a field pair is edited the result can be saved on a server.

When the abstraction instances are opened for editing, an editing screen can include a visual indicator that denotes which abstraction template version is being utilized by a given abstraction value.

When the editor 434 has completed editing the abstraction instances, the compliance review module 432 can merge the edited values and the notes of the two fellow abstraction instances into one merged abstraction instance. That is, once the editor 434 resolves all mismatches, the fellow abstraction instances will be virtually identical, and only one copy needs to maintained. The compliance review module 432 can then determine if a QA process can start.

The editor 434 can also view the list of notes when abstraction instances are opened and can view the details of any note. In case of problems with field values in the abstraction instance, the editor 434 can add editor notes to any field in the abstraction instance. The compliance review module 432 can be configured to automatically append the name, current time and editor name to the note text.

The editor 434 also can read all other notes as general, exception, incomplete and auditor notes, which may be added by other operators or users. Once a new note is read by an editor 434, it can be visually marked.

Once abstraction instances are opened to edit, the editor 434 can change the state of the abstraction instance in one of a predetermined number of ways. The editor 434 can move an abstraction instance from compliance failed to compliance hold. If the compliance engine 430 identified some differences between the double-blind entry abstractions, then the editor 434 can go through these differences, and choose the right solution from one of abstracted instances or mark the instance as an error. If the editor 434 finds that there is insufficient information or the information is too ambiguous to decide which is the correct choice, the editor 434 can redirects the abstraction instance to the compliance hold state and waits for additional information from, for example, the client or project director.

The editor 434 can also move an abstraction instance from compliance failed to abstraction if the editor 434 cannot correct all differences between the abstractions. The editor 434 can redirect the abstraction instances back to the abstraction module 420. The original abstractors 422a and 422b can receive their respective copies of the fellow abstraction instances to review and re-abstract. If not all field errors are commented by the editor 434, the editor 434 may provide a general note.

The editor 434 can also move an abstraction instance from compliance hold to abstraction if the editor 434 cannot correct all differences between the abstractions or the provided information is insufficient or ambiguous. The editor 434 can redirect the abstraction instances back to the abstraction module 420. The original abstractors 422a and 422b can receive their respective copies of the fellow abstraction instances to review and re-abstract.

The editor 434 can also move an abstraction instance from compliance hold to incomplete if the editor 434 cannot get the necessary information to continue the abstraction or the information is simply not available. The editor 434 can redirect the abstraction instances to an incomplete state. The editor 434 can also provide an incomplete note identifying a reason for changing the state to incomplete.

Additionally, an editor 434 can direct an abstraction instance from compliance hold or compliance failed to an awaiting QA state. Once the editor 434 has reviewed all errors and corrects all of them, the editor 434 can complete the edit process by sending the abstraction instances to an awaiting QA state. From this state, the compliance review module 432 merges edited values and the notes of the fellow abstraction instances into one merged abstraction instance.

In the case of any of the state changes described above, the compliance review module 432 can record the time and identify the person that made the state change. Once the compliance review module 434 merges the fellow abstraction instances into a single merged abstraction instance, the compliance review module 432 directs the merged abstraction instance to an awaiting QA module 440.

The awaiting QA module 440 performs a number of functions that are designed to ensure that the abstraction values in the merged abstraction instance are accurate. In one embodiment, the QA process is performed on a batch level and the awaiting QA module 440 waits to receive all of the merged abstraction instances within the batch. In another embodiment, the QA process can be performed on a portion of the batch, where the size of the portion may be equal to the size of one or more merged abstraction instances as is the case in processing batches of abstracts that were previously incomplete.

Additionally, regardless of whether QA operates on an entire batch or a portion of a batch, the QA process can operate on all of the abstraction fields and abstraction values within the abstraction instances or can operate on a subset of fields. Where the QA process operates on a subset of fields, the subset may be a statistical sample of the total number of fields submitted to the QA process. For example, the awaiting QA module 440 can randomly select a set of files from a batch or collection of files. Alternatively, the awaiting QA module 440 can select a statistical sample, such as a percentage of total QA file size. In still another embodiment, the awaiting QA module 440 can select a percentage or a minimum floor value if the percentage is less than the minimum floor value.

The set of files that will be operated on during QA is referred to as the QA sample set. The QA process reviews all abstracted fields in the abstraction instances of the QA sample set and checks their correctness.

The awaiting QA module 440 can be configured to insert one or more errors into the merged abstraction instances. The errors may also be referred to as abstraction errors, synthetic errors, artificial errors, generated errors, mines, or data mines. The use of data mines can help to ensure that the QA process accurately validates the abstracted values in the fields of the abstraction instances.

The awaiting QA module 440 can be configured to randomly determine a number of data mines to insert into the abstraction instances. In one embodiment, the number can be randomly selected between zero and a predetermined maximum mine number or data mine rate. For example, the maximum number of data mines can be 25. In another embodiment, the awaiting QA module 440 can be configured to insert a predetermined number or predetermined percentage of data mines.

The awaiting QA module 440 can be configured to randomly alter fields within the abstraction instances such that the data mines do not always appear in the same field locations within an abstraction instance. For example, the awaiting QA module 440 can use a random generator to determine whether a particular field should be modified to contain an abstraction error.

The awaiting QA module 440 can enter any number of types of errors in to the abstraction fields. The type of error the awaiting QA module 440 inserts can depend on the type of data field.

For example, the awaiting QA module 440 can, for example, transpose values, increment values, or decrement values in a numeric field. In one embodiment, the difference between the original field value and the modified field value is not to exceed a predetermined threshold, such as ten percent of the original value. In another embodiment, the increment and decrement values are predetermined offsets that may be the same or different.

The awaiting QA module 440 can insert an error into a date field, for example, by transposing values and offsetting days, months, or years. The awaiting QA module 440 can be configured such that the modified date field remains a valid date. Alternatively, the awaiting QA module 440 can be configured to insert an error without regard to the validity of the entry.

The awaiting QA module 440 can insert errors into text fields, for example, by transposing letters or words or by clearing non-required fields.

The awaiting QA module 440 can direct the modified abstraction instances to a QA module 450 after inserting all of the errors. The QA module 450 includes an auditor 452 that is configured to validate the abstraction instances. As was the case with the previously discussed modules, one or more of the functions within the QA module 452 can be performed manually, automatically, or as a combination of manual and automatic processes.

For example, the auditor 452 within the QA module 450 can manually perform validation by comparing the abstraction instances against the input document. In another embodiment, the auditor 452 automatically performs validation by electronically comparing an electronic version of the input document against one or more abstraction instances. In still another embodiment, the auditor 452 includes an automated process, such as a software process, that receives manual operator input.

The auditor 452 validates the abstracted data by comparing information in the input document against the fields of one or more abstraction instances. The auditor 452 corrects the errors discovered as a result of the comparison.

If the auditor 452 discovers errors during the review process, the auditor 452 can indicate which field contains an error. The auditor 452 can also enter the correct value for that particular field based upon a review of information in the contract or other input document. Each field within the abstract template can be associated with a score or identifier, such as High, Medium, or Low. The number of fields corrected by the auditor 452 and the scores associated with those fields can be aggregated across all abstraction instances within the sample set. The aggregate value can be used to determine whether a batch passes or fails audit.

Additionally, the performance of the auditor 452 can be checked by the system based in part on the artificial errors inserted randomly into the abstraction values in the QA Sample Set. Ideally, the auditor 452 detects and corrects all the data mines inserted into the abstraction instances.

In one embodiment, the auditor 452 can access a list of abstraction instances from the QA Sample Set that are not yet assigned to an auditor. From this list, an auditor 452 can assign itself to one or more abstraction instances or documents.

The auditor 452 can access the list of abstraction instances that are in the QA sample set of a batch. The auditor 452 can select one or more abstraction instances from the QA Sample Set being audited. The auditor 452 can then assign itself the selected abstraction instances. In response to the auditor's 452 actions, the QA module 450 can store the abstraction instances assigned to an auditor 452.

Thus, an auditor 452 can access the list of abstraction instances to which they are already assigned. From this list, the auditor 452 can open an abstraction instance and perform the validation process. Thus, the auditor 452 can perform audits of abstraction instances in any order, and does not need to perform the audits in the order that the files were assigned.

To validate an abstraction instance, the auditor 452 can open or otherwise access an abstraction instance. The auditor 452 reviews all fields in the abstraction instance and identifies all errors. An error could be either a data mine error or an abstraction error. When errors are encountered, the auditor 452 can indicate which field contains an error as well as the correct value for that particular field. The auditor can determine the correct value based in part on the information and data contained within the original input document. The QA module 450 can store the corrections made by the Auditor 452 for each error field found within each abstraction instance. As described earlier, each field can be associated with a score, such as High, Medium, or Low.

The auditor 452 can release the audited result to the QA module 450 after completing the validation. The QA module 450 can also generate an audit report as part of the auditing process. The QA module 450 can be configured to store corrected values that were not data mine errors as temporary values next to the original field values. Additionally, the QA module 450 can determine or otherwise calculate the missed data mines and the number of abstraction errors found by the auditor 452. The number of missed data mines and abstraction errors detected can also be stored by the QA module 450 as part of QA validation. The QA module 450 can also record the time for completion of the audit process for this abstraction instance. The QA module 450 can also calculate the overall auditing time.

The auditor 452 can view the list of notes when an abstraction instance is opened and can view the details of any note. In case of problems with field values in the abstraction instances, the auditor 452 can add Auditor Notes to any field in the abstraction instance. The QA module 450 can automatically append the name, time and identity of the auditor to the note text. The auditor 452 also can read all other notes added by other operators. Once a new note is read by an auditor 452, the action of reading the note can be recorded in the system.

The QA module 450 directs audited abstraction instances to a QA validation module 460 once the auditor 452 completes the audit process. The QA validation module 460 can be configured to determine the accuracy and completeness of the auditing and validation process performed by the QA module 450. The abstraction instances provided by the QA module 450 can either pass or fail validation in the QA validation module 460.

The QA validation module 460 can validate an abstraction instance using a variety of criteria. In one embodiment, the QA validation module 460 conducts validation by examining the number of abstraction errors identified by the QA module 450. The QA validation module 460 can determine an audit sample fails if a percentage of Low-Value Abstraction Errors Found exceeds a predetermined Low-Value Abstraction Error Threshold. Additionally, the QA validation module 460 can determine a failed audit sample if a percentage of Medium-Value Abstraction Errors Found exceeds a predetermined Medium-Value Abstraction Error Threshold. The QA validation module 460 can also determine a failed audit sample if a percentage of High-Value Abstraction Errors Found exceeds a predetermined High-Value Abstraction Error Threshold.

In the context of the QA validation module 460, the percentage of Abstraction Errors Found for each type (High, Med, Low) can be calculated by dividing the Total Number of Abstraction Errors Found (High, Med, Low) by the respective Total Number of Abstraction Fields (High, Med, Low) across all abstraction instances within the audit sample. The Low-Value Abstraction Error Threshold, Med-Value Abstraction Error Threshold and High-Value Abstraction Error Threshold can be set as a percentage for example, 99.999%, at batch level using a global default.

Alternatively, the QA validation module 460 can determine an audit failure if a percentage of Low-Value Data Mine Errors Not Found exceeds a Low-Value Data Mine Threshold. Additionally, the QA validation module 460 can determine an audit failure if a percentage of Medium-Value Data Mine Errors Not Found exceeds a Medium-Value Data Mine Threshold. The QA validation module 460 can also determine an audit failure if a percentage of High-Value Data Mine Errors Not Found exceeds a High-Value Data Mine Threshold The percentage of Data Mine Errors Not Found for each type (High, Med, Low) can be calculated by dividing the Total Number of Data Mine Errors NOT Found (High, Med, Low)

by the Total Number of Data Mines Inserted (High, Med, Low) across all abstraction instances within the audit sample. The Low-Value Data Mine Threshold, Med-Value Data Mine Threshold and High-Value Data Mine Threshold can be set as a percentage, for example 99.999%, at batch level with global default.

If the audited abstraction instances pass the QA validation process, the QA validation module 460 directs the audited and validated abstraction instance to a release module 470. The release module 470 can be configured to accept all of the abstraction errors detected and identified in the QA module 460. The release module 470 can also be configured to convert the abstraction module to a particular format, such as an XML abstraction instance. Once the release module 470 generates the final data format, the data abstraction is complete and the abstracted data is released 472.

Alternatively, if the audited abstraction instance fails the QA validation process, the abstraction instance is sent to a clean room module 480 for further processing. Within the clean room module 480 one or more managers 482 can analyze the audit and attempt to correct all remaining errors.

The audit report allows the manager 482 to "troubleshoot" an audit. Using this report, the manager 482, such as a project manager or project lead can continue the abstraction process using a variety of available options.

The manager 482 can accept all auditor corrections identified as associated with abstraction errors NOT for data mine errors. Alternatively, the manager 482 can reject all auditor corrections identified as associated with abstraction errors NOT for data mine errors. In still other alternatives, the manager 482 can select an abstraction value and accept the auditors corrections, select an abstraction value and reject the auditor corrections, select an abstraction value and edit it, thereby discarding auditor corrections for that abstraction value. In other alternatives, the manager 482 can approve a batch. All abstraction instances in a batch are directed to the release module 470, thereby discarding all auditor corrections not previously accepted. The manager 482 can reject a batch. All abstraction instances in a batch will get the "Compliance Failed" status, thereby discarding all auditor corrections. The manager 482 can re-sample a batch. All abstraction instances in a batch will get the "locked in QA" status, thereby discarding all auditor corrections. The manager 482 can also move an abstraction instance from failed in QA to incomplete.

In order to approve a failed batch, the manager 482 can view the audit report. The auditor report can include the list of documents where auditor has discovered errors. The manager 482 can select the batch that is in Failed in QA status from the report above. Then the manager 482 can approve the batch. Once the batch is approved, all abstraction instances in the batch will get the Ready for release status and the batch will be directed to the release module 470.

The clean room module 480 can discard all auditor corrections not previously accepted. The clean room module 480 can log information identifying each abstraction error found that is overridden along with the error value and corrected value. The release module 470 can generate the XML representation of all abstraction instances in the batch.

The manager 482 can reject a batch after viewing the audit report. The auditor report can include the list of documents where auditor has discovered errors. The manager can select the batch that is in Failed in QA status from the report above. The manager can then reject the batch. If the batch is rejected, all abstraction instances in the batch will get the compliance failed status. The clean room module 480 discards all auditor corrections not previously accepted.

A manager 482 can order to clear all audit results and corrections and resample the batch. Re-sampling means the QA Sample Set will be randomly recreated. All abstraction instances will go to locked in QA state. Therefore the entire quality assurance process must start again. The clean room module 480 deletes all corrections of all auditors for the previous QA Sample Set. All auditors will be unassigned from the abstraction instances in the QA Sample To accept all auditor correction, the manager can select a batch that is in Failed in QA status from the audit report. The manager accepts all corrections from all auditors for each abstraction instance in the QA Sample Set. Of course, only those corrections that overwrite the original field values are accepted. The clean room module 480 can log information identifying each abstraction error found that is overridden along with the error value and corrected value.

To accept a single abstraction instance, the manager can select an abstraction instance from the failed batch. The manager can accept all corrections from that auditor who audited this single abstraction instance in the QA Sample Set. The clean room module 480 can log the information identifying each abstraction error found overridden along with the error value and corrected value.

The manager may reject all auditor corrections by selecting a failed batch. The manager can reject all corrections from all auditors who audited the QA Sample Set in the failed batch. The clean room module can delete all corrections of the all auditors in this QA Sample Set.

The manager can also reject auditor corrections for a single abstraction instance. The manager 482 can select an abstraction instance from the failed batch. The manager can reject all corrections from that auditor who audited this single abstraction instance in the QA Sample set. The clean room module can delete the corrections of the auditor.

Managers 482 can edit the abstraction instance when the data are in Failed in QA or Ready for Release state. Editing can work the same as it would work for an abstractor, for example 422a. This option allows the managers 482 to make last minute changes in the abstraction, especially if the batch is failed and some errors must be directly corrected by the operators. The changes in the abstraction will not invoke the compliance engine or the auditing process.

If the abstraction instance is in "Failed in QA", and a manager 482 edits an abstraction instance, the clean room module 480 can discard any unaccepted auditor corrections made to that abstraction instance. After the abstraction instance is submitted by the manager 482, the clean room module 480 can record which changes were made to which fields. The clean room module can also record the time of the change and the operator making the change.

If the manager 482 has reviewed an audit report and determined that the abstraction instance contains incomplete information that causes abstraction to be ambiguous or incorrect, the manager 482 can determine the abstraction is incomplete or that abstraction should be extended. The manager 482 can move this abstraction instance into an incomplete state. The abstraction instance can be removed from its current batch and placed into the incomplete-batch 484 of the DPC processing the current batch.

Figure 5:
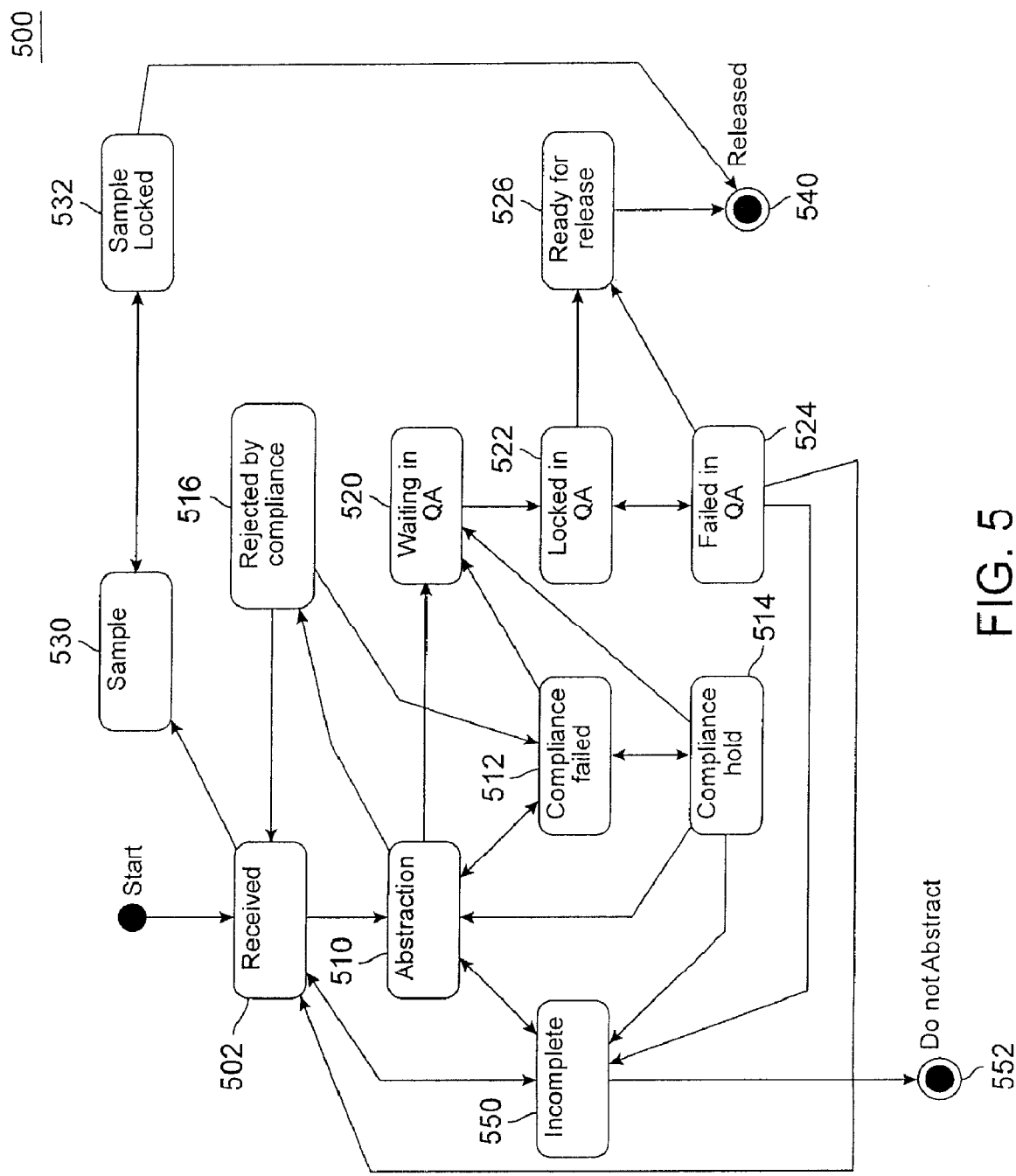
FIG. 5 is a state diagram of an embodiment of an abstraction process of the present disclosure.

FIG. 5 shows a state diagram 500 showing the possible states and state transitions for the documents within the system 200 of FIG. 4. The various states in the state diagram include received 502 when the abstraction instance has been created within a project and is associated with a document image. The abstraction process for this particular abstraction instance may not have begun when in the received 502 state. The abstraction 510 state occurs when one or more abstractors are currently working on this abstraction instance. The abstraction instance remains in this state until all abstractors have completed the abstraction process.

Following abstraction, the compliance engine compares abstraction instances and may have found differences in the abstractions created via the double-blind entry process. The state of the abstraction instances is compliance failed 512. The abstraction instance can be either waiting for an editor to review, an editor is currently reviewing the abstraction instance, or the abstractor can be re-abstracting the abstraction instance.

The compliance hold 514 state occurs if the editor finds ambiguous information and is waiting for additional information from the client or a project director. The incomplete 550 state can occur if the original document, such as a contract, does not contain all the necessary information to complete abstraction. While in the incomplete 550 state, the system may wait for additional information from the client or project director.

A do not abstract 552 state may occur if the document image will not be abstracted within a particular project. The state may occur for a variety of reasons, including: the client didn't provide the necessary info within a reasonable time period, the document image is unusable, or there is some other reason the document should not be abstracted.

The rejected by compliance 516 state may occur if the differences in the two abstractions were higher than allowed that is, higher than a predetermined compliance threshold. As a result, the abstraction instances must be re-abstracted.

In the waiting for QA 520 state, the abstraction is complete and has passed through compliance. However, in some embodiments, before QA can begin, all abstraction instances in that batch must be completed or in the incomplete state.

The locked in QA 522 state can occur when an auditor is conducting Quality Assurance on the batch to which an abstraction instance belongs. The failed in QA 524 state can occur if the batch to which the abstraction instance belongs has failed in QA. Therefore all abstraction instances associated with the batch can have this state.

The ready for release 526 state can occur when the abstraction instance passed the Quality Assurance process. A project director may still have the right to edit it or resend the abstraction instance to another Quality Assurance process. The system can generate an XML representation of all abstraction instances in the batch.

The released 540 state occurs when the abstraction instance is complete and error-free. If all the abstraction instances within a batch are in this state, the completed abstraction can be delivered to the customer. The system can generate an XML representation of all abstraction instances in the batch.

The sample 530 state can occur when the contract or input document is assigned to a sample batch. It can be freely edited without further workflow process. Finally, the sample locked 532 state can occur when the project director has locked the content of a sample abstraction instance. In this state, the sample abstraction instance can be delivered to the customer as a sample abstraction. The system can generate an XML representation of the abstraction instance.

The various documents and files can transition between certain states within the state diagram 500. A transition from the received state 502 to the abstraction state 510 may occur when an abstractor begins working on a document, for example a contract. The abstractor can assign the given abstraction instance to himself by entering the document ID of the document image.

A transition from the received state 502 to the incomplete state 550 can occur when a document image is incomplete or unreadable. A manager can move the abstraction instance into the incomplete state 550.

A transition from the received state 502 to the sample state 530 may occur when an operator decides to abstract a document image as a sample abstraction instance. If a document image is abstracted as a sample, then it will be out of the normal abstraction workflow. Later the sample abstraction instance can be directly released.

A transition from the abstraction state 510 to the compliance failed state 512 may occur when abstractors submit the abstraction to the compliance engine and the compliance engine determines differences in the two abstractions after the double-blind entry process, but the compliance threshold was not exceeded.

A transition from the abstraction state 510 to the incomplete state 550 can occur if the abstractor cannot find appropriate information to complete the abstraction. The abstractor can move the abstraction instance into the incomplete state 550.

A transition from the abstraction state 510 to the rejected by compliance state 516 can occur if the compliance engine calculates the number of differences between the abstraction instances created during double-blind entry is greater than the compliance threshold. The abstraction can be automatically failed. The first time this happens, the abstraction instances can be sent back to the original abstractors. The second time this happens, the abstraction instances can be sent to the rejected by compliance state 516.

A transition from the abstraction state 510 to the waiting for QA state 520 can occur when abstraction is done and no differences found. The document may need to wait in this state until QA starts.

A transition from the compliance failed state 512 back to the abstraction state 510 can occur when the editor could not correct the problems coming from the compliance. The editor can annotate the differences and can redirect the abstractions to the original abstractors for correction.

A transition from the compliance failed state 512 to the compliance hold state 514 can occur if the editor found ambiguous information and is waiting for additional information from the client or project director.

A transition from the compliance failed state 512 to the waiting for QA state 520 can occur if the editor was able to choose the correct values from one of the multiple abstraction instances created during the double-blind entry process. Therefore the abstraction instances of the double-blind entry process can be merged and sent to QA.

A transition from the compliance hold state 514 to the abstraction state 510 can occur when differences in fellow abstraction instances are annotated by the editor and the abstractors are directed to correct them.

A transition from the compliance hold state 514 to the incomplete state 550 can occur if the editor could not get the required info from external sources in a specific timeframe, or the information in the document image is ambiguous. Therefore the editor can decide to send this abstraction instance into the incomplete queue of abstraction instances.

A transition from the compliance hold state 514 to the waiting for QA state 520 can occur if the editor receives all the necessary or missing information from the client or the project lead. Therefore the editor can finish the editing process.

A transition from the incomplete state 550 to the received state 502 can occur if missing or needed information is provided by the client and the abstraction instance is ready for abstraction. This transition may occur if the abstraction instance has not yet been abstracted.

A transition from the incomplete state 550 to the abstraction state 510 can occur if missing or needed information is provided by the client and the abstraction can be continued. Therefore the manager can deliver the abstraction instance back to the abstractor that originally performed the abstraction.

A transition from the incomplete state 550 to the Do Not Abstract 552 state can occur if the document image will not be abstracted within a particular project for one of several reasons. For example, the client may not have provided the necessary info within a reasonable time period or the document image is unusable, or the document should not be abstracted for some other reason. This decision is typically made by the managers manually.

A transition from the rejected by compliance state 516 to the received state 502 may occur is a supervisor or manager decides that, after exceeding the automatic compliance threshold for the second time, the original abstractors need to be replaced. In this case, the manager can unassign the abstraction instance from the original abstractors.

A transition from the rejected by compliance state 516 to the compliance failed state 512 can occur if a manager decides that, after exceeding the automatic compliance threshold for the second time, the abstraction instances should be sent to the editor for compliance.

A transition from the waiting for QA state 520 to the locked in QA state 522 can occur when all abstraction instances in a batch are in one of the following states: Do not abstract 552, incomplete 550 or Waiting For QA 520. In this condition, the system starts the audit process. This state transition can happen for all the abstraction instances of a batch that were in Waiting for QA state 520 at the same time.

A transition from the locked in QA state 522 to the failed in QA state 524 may occur after an auditor audits each abstraction instance in a QA Sample Set. Once the auditors have completed the audit for all abstraction instances in the QA Sample Set, the system will evaluate the Number of Abstraction Errors Found and Number of Data Mine Errors Not Found and determine if these values exceed the audit threshold. If the audit threshold for that batch is exceeded, all abstraction instances in that batch will be changed to the Failed in QA state 524. This state transition happens for all the abstraction instances in the batch that were in locked in QA state 522 at the same time.

A transition from the Failed in QA state 524 to the received state 502 can occur if the project manager has reviewed an audit report and determined that each abstraction instance should be reviewed by abstractors. This state transition can happen for all the abstraction instances within a batch that were in Failed in QA state 524 at the same time.

A transition from the Failed in QA state 524 to the locked in QA state 522 can occur if a project manager chooses to restart the Quality Assurance process and resamples the QA Sample Set. This state transition can happen for all the abstraction instances within a batch that were in Failed in QA state 524 at the same time. This may be referred to as resampling a failed batch.

A transition from the Failed in QA state 524 to the ready for release state 526 can occur if a project manager has reviewed an audit report and determined that the batch can be released. This state transition can happen for all the abstraction instances within the same batch that were in Failed in QA state 524 at the same time. This process may alternatively be referred to as approving a failed batch.

A transition from the Failed in QA state 524 to the incomplete state 550 can occur if the project manager has reviewed an audit report and determined that the abstraction instance contains incomplete information that results in abstraction being ambiguous, incorrect or needing to be extended. The manager can move this abstraction instance into incomplete state 550 and furthermore the abstraction instance may be removed from its current batch and placed into the incomplete batch of the DPC.

A transition from the locked in QA state 522 to the ready for release state 526 can occur once the auditor audits all the abstraction instances in the QA Sample Set. When the auditor is complete, the system can evaluate the Number of Abstraction Errors Found and Number of Data Mine Errors Not Found and determine if these values exceed the audit threshold. If the audit threshold for that batch is NOT exceeded, the batch can automatically pass the Quality Assurance process and all abstraction instances in that batch will be changed to the Ready for Release state 526. All non-data mine corrections of field values can be automatically committed to the abstraction instance. The state transition can occur for all the abstraction instances of the same batch that were in locked in QA state 522 at the same time.

A transition from the sample state 530 to the sample locked state 532 can occur if the project director decides to lock the content of the sample abstraction. A transition from the sample locked state 532 back to the sample state 530 can occur if the project director wants to edit the sample abstraction instance again. The director can unlock the content of the sample abstraction instance.

A transition from the sample locked state 532 to the released state 540 can occur when the last batch is released project director. The system can change the state of all abstraction instances in sample locked state 532 to released 540

A transition from the ready for release state 526 to the released state 540 can occur when a project director releases the entire batch after all abstraction is fully finished. After this, the abstraction instance can be fully ready for data extraction. This state transition happens for all the abstraction instances that were in Ready for Release state 526 at the same time. This can be referred to as process releasing a batch.

It is also possible to go from all states to received 502 in case of rework of a batch. This state transition can occur when a project director decides to rework a batch. In this case, all abstraction instances in the batch will go back to received state 502 independent of the current state.

Figure 6:
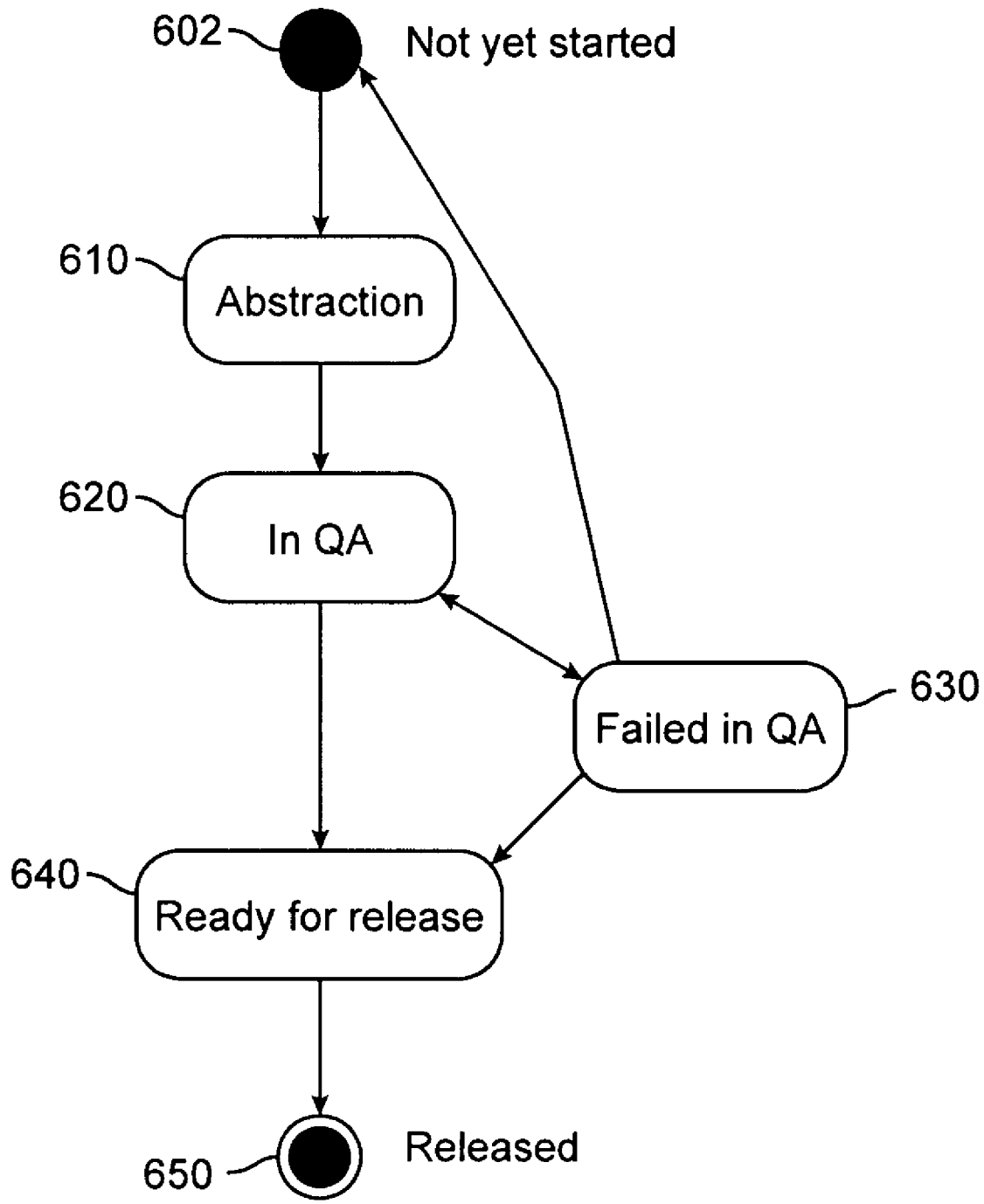
FIG. 6 is a state diagram of a batch process that may be implemented in the disclosed abstraction process.

FIG. 6 is a state diagram of a batch process 600 showing the possible state transitions. The state of a batch can be defined based on the aggregate states of all abstraction instances belonging to that batch. The term 'all abstraction instances' typically refers to all abstraction instances assigned to a particular batch. In case of any other combination of states of abstraction instances described below the batch state is undefined. Therefore the undefined states may be prevented in the system using proper transition rules in the workflow.

The possible batch states include ready state 602 where all abstraction instances are in a received state. The batch can transition to the abstraction state 610 when at least one abstraction instance transitions to an incomplete or abstraction state.

In the abstraction batch state 610, all abstraction instances can be in one of the following states: Received, Abstraction, Incomplete, Do not abstract, Compliance failed, Compliance hold, Rejected by Compliance and Waiting for QA. At least one abstraction instance is in other than a Received state.

The batch transitions from the abstraction state 610 to the In QA state 620 when the audit of the batch starts. The In QA state 620 occurs when all abstraction instances are in one of the following states: Do not abstract, Incomplete, Locked in QA. At least one abstraction instance is in a Locked in QA state.

The Failed in QA batch state 630 occurs if all abstraction instances are in one of the following states: Do not abstract or Failed in QA. The batch can transition from In QA 620 to Failed in QA 630 if the result of audit failed in the audit batch process. Conversely, the batch can transition from the Failed in QA 630 back to the In QA 620 when a project manager initiates resampling of the failed batch.

The ready for release 640 batch state occurs when all abstraction instances are in one of the following states: Do not abstract or Ready for release. The batch state can transition from In QA 620 to Ready for Release 640 when the result of audit passed in the Audit batch process. The batch state can transition from Failed in QA 630 to Ready for Release 640 if a failed batch is approved by a manager or project director.

Finally, the Released state 650 occurs when all abstraction instances are in one of the following states: Do not abstract or Released. The batch can transition from Ready for Release 640 to Released 650 when the batch is ready for final delivery.

Figure 7:
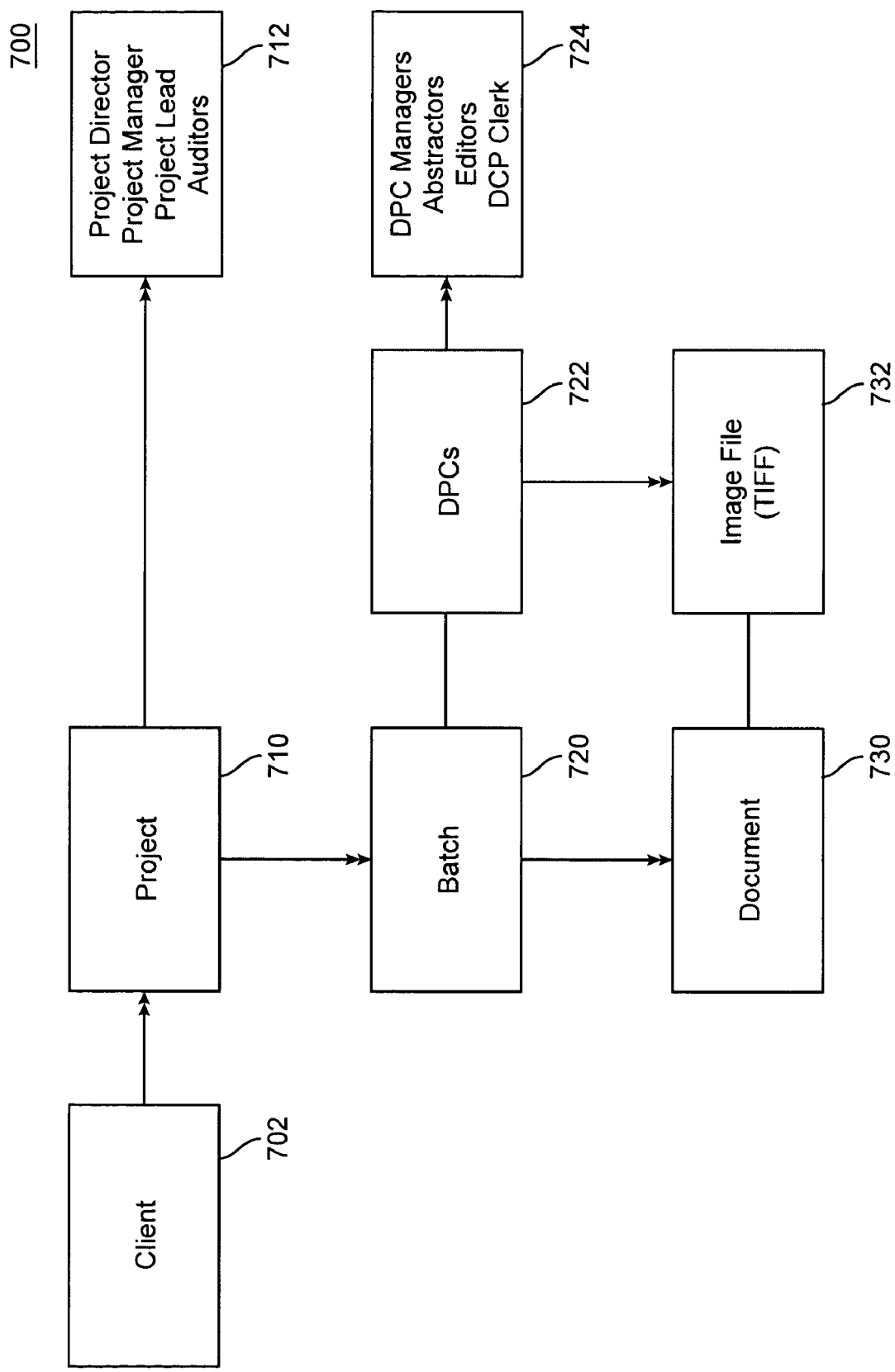
FIG. 7 is a diagram of a data model showing entity relationships in an embodiment of the disclosed abstraction process.

FIG. 7 is a diagram of a data model 700 showing relationships of entities in an embodiment of the abstraction process. The data model 700 shows the relationships between the various entities and products associated with an abstraction project. A client 702 initiates a project 710 by interfacing with managers 712. The managers 712 divide the project 710 into batches 720 that contain documents 730 in the form of image files that are operated on by DPCs 722 using DPC staff 724. The DPC staff 724 generate abstraction instances. The image files 732 can be printed for hardcopy distribution.

Figure 8:
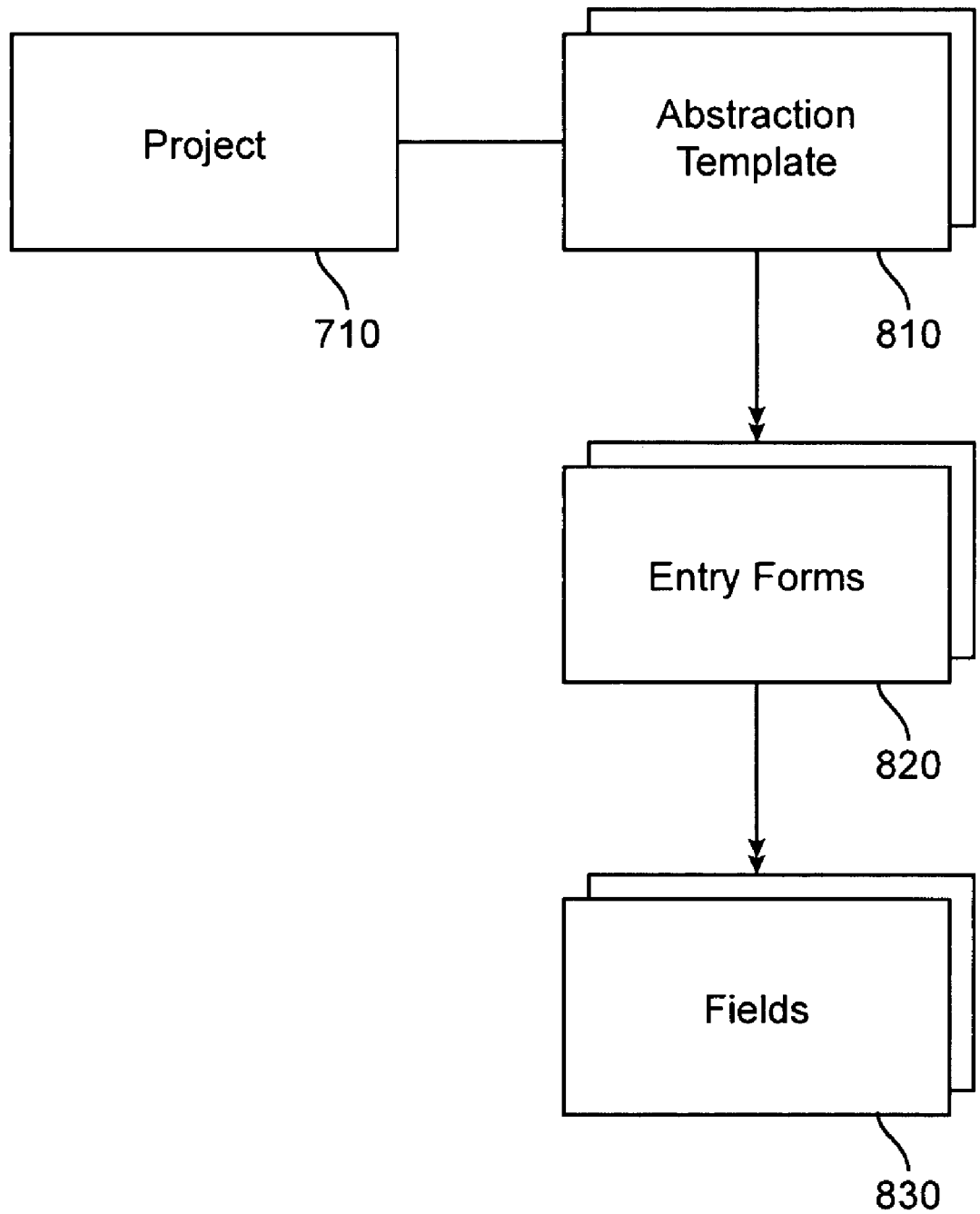
FIG. 8 is a diagram of a data model of relationships in a project definition portion of an embodiment of the disclosed abstraction process.

FIG. 8 is a diagram of a data model 800 of form relationships in a project definition portion of an embodiment of the disclosed abstraction process. The project 710 defined in FIG. 7, is abstracted by generating one or more abstraction templates 810. The one or more abstraction templates 810 can include one or more entry forms 820. In turn, each entry form 820 can include one or more fields 830 configured to receive abstraction values.

The abstraction template, and the forms within the abstraction template are configured at the beginning of a project, prior to performing the majority of abstractions. The abstraction template can be configured, for example, in a form builder. The template can be configured based on the type of document being abstracted. For example, real estate contracts may advantageously use a different abstraction template from manufacturing contracts or licensing agreements. Abstraction templates are created with the dynamic form builder without requiring the involvement of a programmer.

Figure 9:
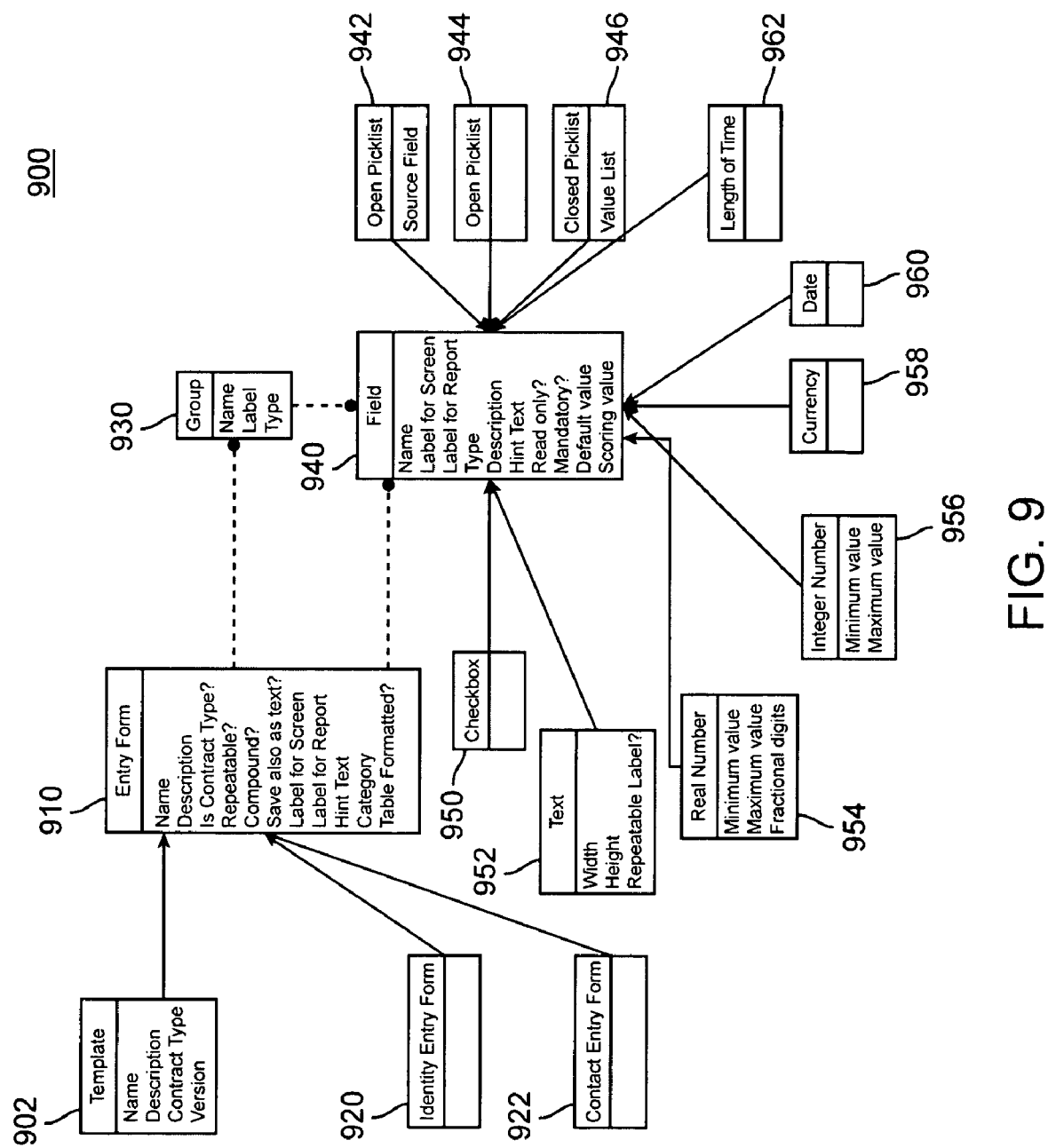
FIG. 9 is a relational block diagram of a form builder of an embodiment of the disclosed abstraction system.

FIG. 9 is a relational data model for the template building process within the form builder. Each box in the diagram is an entity with the associated attributes listed below the entity name.

The forms can be built, for example, from an initial template, or can be built from scratch without using a template. The entity schema 900 shows the entities and the fields within the entities.

Figure 10:
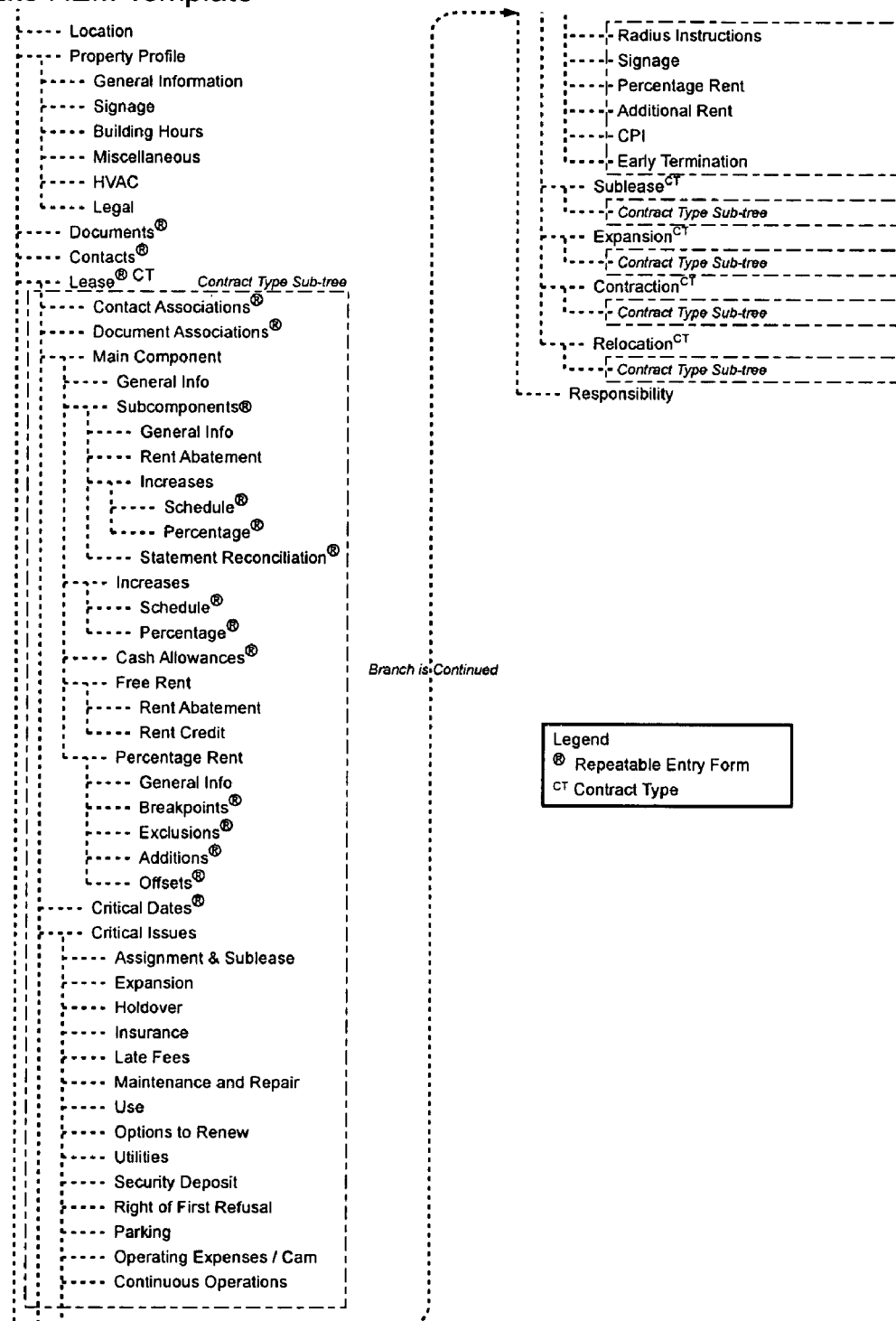
FIG. 10 is an outline of an embodiment of a template used in an embodiment of the disclosed abstraction system.

The template 902 can be used to originate one or more entry forms 910. The entry forms may relate to, and include, an identity entry form 920 and a contact entry form 922. Additionally, each entry form 910 can define a group 930 as well as one or more fields 940. The fields can include checkbox 950, text 952, real number 954, integer number 956, currency 958, and date 960. Other entries in the field 940 can include a length of time 962. The fields may also be defined as picklists and the filed 940 can relate to an open picklist 942, a contact picklist 944, and a closed picklist 946. Thus, the various forms in an abstraction template may be generated using any number of fields having any number of field types, and the forms do not need to be limited by the schema 900 of FIG. 9. FIG. 10 is an example of an abstraction template 1000 outline used for real estate management that was generated using the process described by the entity schema 900 of FIG. 9.

Figure 11:
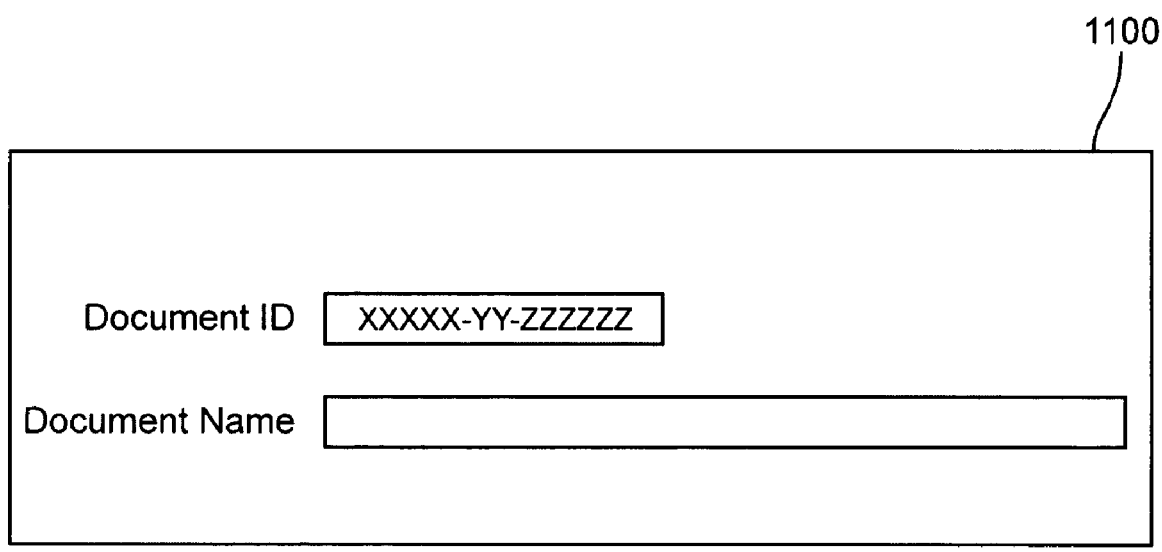
FIG. 11 is a screen image of an identity entry form of the disclosed abstraction system.

FIG. 11 is a screen image of an embodiment of an identity entry form 1100 that can form a part of an abstraction template. The form 1100 can include multiple fields that are completed by an abstractor, or alternatively, completed by a manager when configuring the abstraction project.

Figure 12:
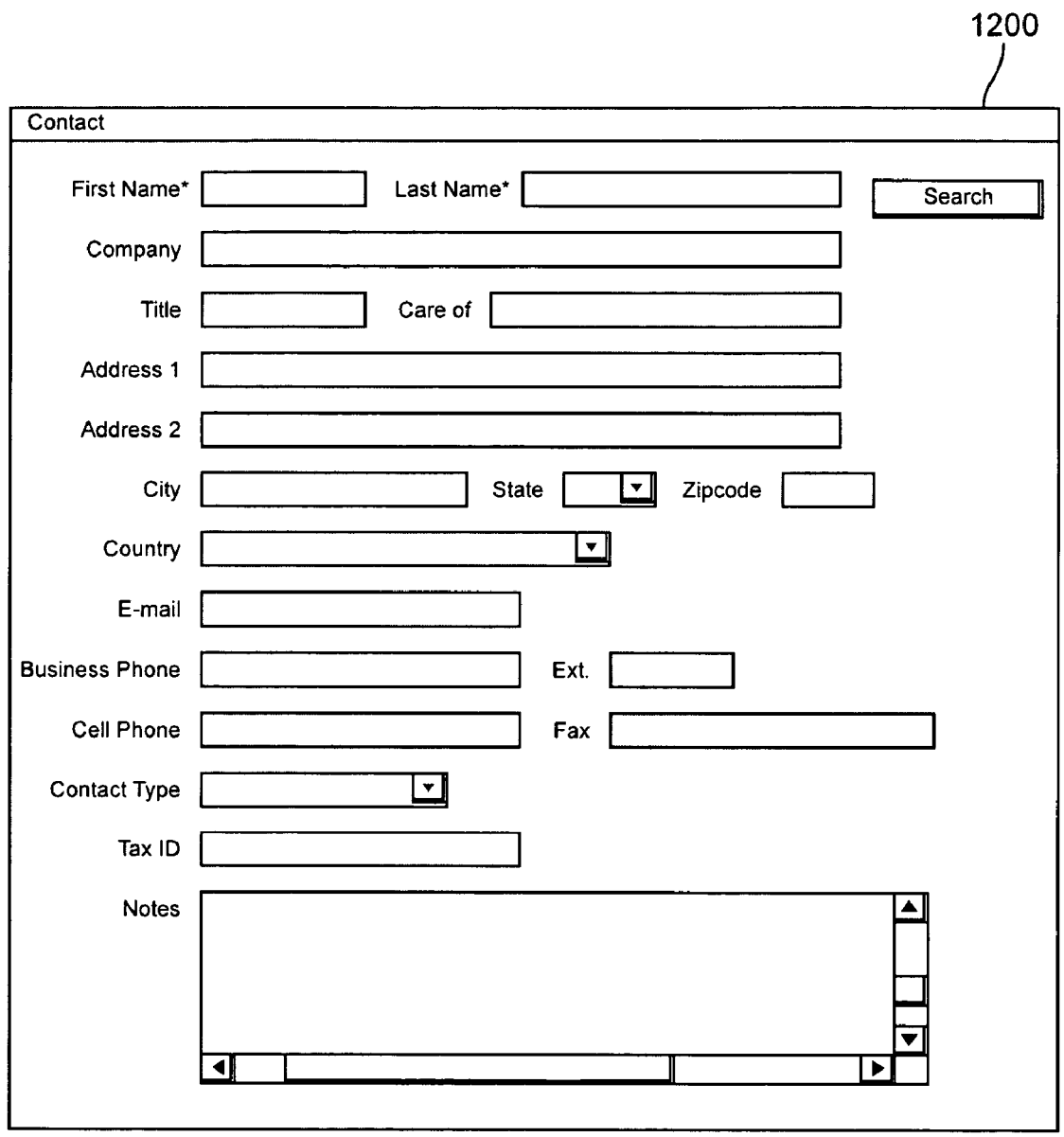
FIG. 12 is a screen image of a contact entry form of the disclosed abstraction system.

FIG. 12 is a screen image of an embodiment of a contact entry form 1200 that can form a part of an abstraction template. The form 1200 can include multiple fields that are completed by an abstractor or by a manager during the course of the abstraction project.

Thus, systems, methods, and devices for building an abstraction have been disclosed. The various systems, methods, and devices disclosed are not intended to limit the scope of any systems, methods, and devices for building an abstraction, but rather are provided as examples to illustrate a general abstraction control solution. Those of ordinary skill in the art will recognize that modifications, design changes, and alternatives may be implemented without departing from the scope of the disclosure.

What is claimed is:

1. A computer-implemented method of data abstraction, the method comprising:
    abstracting data from a document comprising a contract using a double blind abstraction to create a plurality of abstraction instances having abstracted data representative of contractual obligations from the contract;
    comparing at least two of the plurality of abstraction instances to identify compliance errors;
    determining a compliance value based on a number of compliance errors identified;
    comparing the compliance value to a predetermined compliance threshold;
    rejecting the at least two abstraction instances and re-initiating abstraction of the document when the compliance value equals or exceeds the predetermined compliance threshold;
    editing the at least two abstraction instances to correct the identified compliance errors when the compliance value is less than the predetermined compliance threshold;
    inserting abstraction errors within one of the plurality of abstraction instances to generate a mined abstraction instance;
    validating a quality of the abstracted data by comparing the document with the mined abstraction instance; and
    releasing an abstraction instance having at least one abstraction value.

2. The method of claim 1, further comprising generating a merged abstraction instance from the plurality of abstraction instances.

3. The method of claim 1, further comprising validating quality of the abstracted data by comparing the document with at least one of the plurality of abstraction instances.

4. The method of claim 1, further comprising validating quality of a sampled set of abstractions from at least one batch of abstraction instances.

5. A method of data abstraction, the method comprising:
abstracting data from a document using a double blind abstraction to create two abstraction instances having abstracted data, wherein each abstraction instance is based on a predetermined template corresponding to a type of the document and wherein the template specifies the data to be abstracted in the double blind abstraction;
comparing the two abstraction instances for a predetermined compliance threshold;
generating a merged abstraction instance from the two abstraction instances;
validating quality of at least a portion of the abstracted data; and
releasing a validated abstraction instance having at least one abstraction value.

6. A computer-implemented method of data abstraction, the method comprising:
receiving a plurality of abstraction instances from a double blind abstraction of a document, wherein the document comprises a contract;
comparing at least two of the abstraction instances to determine a number of compliance errors, wherein a compliance error comprises a mismatch between dam representative of a contractual obligation from the at least two abstraction instances; rejecting the compared abstraction instances if-when the number of compliance errors exceeds a predetermined compliance threshold; re-initiating abstraction of the document when the compared abstraction instances are rejected;
editing the compared abstraction instances to correct the compliance errors when the number of compliance errors does not exceed the predetermined compliance threshold;
generating a merged abstraction instance based on the compared abstraction instances;
inserting at least one error in a known location of the merged abstraction instance to create a mined abstraction instance;
validating abstracted data in the mined abstraction instance; and
releasing an abstraction instance having at least one abstraction value.

7. One or more processor readable storage devices having stored therein one or more processor readable instructions, one or more processors executing the one or more processor readable instructions configured to perform the method comprising:
receiving a plurality of abstraction instances from a double blind abstraction of a contract, wherein the abstraction instances include data representative of contractual obligations;
comparing at least two of the abstraction instances to determine a number of compliance errors;
rejecting the compared abstraction instances if the number of compliance errors exceeds a predetermined compliance threshold;
re-initiating abstraction of the document when the compared abstraction instances are rejected;
editing the abstraction instances to the correct compliance errors when the number of compliance errors is below the predetermined compliance threshold;
receiving an abstraction instance having at least a portion of the compliance errors resolved if the number of compliance errors does not exceed the predetermined compliance threshold;
inserting at least one error in a known location of the abstraction instance;
receiving a validated abstraction instance; and
releasing an abstraction instance having at least one validated abstraction value.

8. A data abstraction system having at least one processor and a storage device, wherein the at least one processor comprises:
a compliance engine configured to receive from the storage device a first abstraction instance having data representative of contract terms extracted from a contract and a second abstraction instance having data representative of the contract terms from the contract, and configured to compare the first abstraction instance to the second abstraction instance to identify compliance errors, to reject the abstraction instances if a number of compliance errors exceeds a predetermined threshold, and to edit the abstraction instances to correct the compliance errors when the number of compliance errors is below the compliance threshold;
a quality assurance module configured to receive a merged abstraction instance based in part on the first and second abstraction instances, and further configured to insert a number of abstraction errors into the merged abstraction instance to create a mined abstraction instance; and
a validation module configured to receive an audited abstraction instance based in part on the mined abstraction instance, and further configured to release the audited abstraction instance based in part on a number of corrected abstraction errors in the audited abstraction instance.

9. The system of claim 8, wherein the at least one processor further comprises an abstraction module configured to generate the first abstraction instance and the second abstraction instance in a double blind document abstraction.

10. The system of claim 8, wherein the at least one processor further comprises an auditor module configured to receive the mined abstraction instance, compare the mined abstraction instance against an original document, and generate the audited abstraction instance based in part on the comparison.

11. The system of claim 8, wherein the at least one processor further comprises a batch processing module configured to receive at least one document the abstraction, and further configured to generate one or more abstraction batches based on the at least one document.

12. The system of claim 8, wherein the at least one processor further comprises a form builder configured to receive configuration inputs and generate a customized abstraction template based in part on fields within at least one document.

13. The system of claim 8, wherein the processor further comprises:
a batch processing module configured to receive a document for abstraction;
a form builder configured to generate an abstraction template based in part on the document; and
an abstraction module configured to receive the document from the batch processing module and generate, based in part on the abstraction template, the first abstraction instance and the second abstraction instance in a double blind abstraction of the document.

14. The system of claim 13, wherein each field in the abstraction template is assigned a scoring value.

15. The system of claim 14, wherein the scoring value is selected from the list consisting of high, medium, and low.

16. The system of claim 14, wherein the number of compliance errors comprises a sum of identified errors weighted in part on the scoring value of a corresponding field.

17. The system of claim 14, wherein the number of compliance errors comprises a number of errors having the same scoring value.

18. The system of claim 8, wherein the quality assurance module inserts the number of abstraction errors comprising a random number between zero and a predetermined maximum number of errors.

19. The system of claim 8, wherein the number of abstraction errors the quality assurance module inserts into the abstraction instance comprises a predetermined constant number of errors.

20. The system of claim 8, wherein the quality assurance module inserts an abstraction error comprising a numeric transposition.

21. The system of claim 8, wherein the quality assurance module inserts an abstraction error comprising a deletion of a field.

22. The system of claim 8, wherein the quality assurance module inserts an abstraction error comprising an alteration of a date.

23. A computer-implemented method of data abstraction, the method comprising:

a) initiating abstraction of documents for a project in a plurality of batches;

b) performing a double-blind abstraction of the documents in a first batch to create a plurality of abstraction instances, each abstraction instance comprising a collection of abstraction data specified by a template, each piece of abstraction data having a score associated therewith;

c) determining an aggregate compliance value for the abstraction instances in the first batch based on the abstraction data and the associated scores;

d) editing the abstraction instances to correct compliance errors in the first batch when the aggregate compliance value exceeds a predetermined level;

e) failing the abstraction instances in the first batch when the aggregate compliance value is below the predetermined level;

f) reinitiating abstraction of the failed abstraction instances;

g) validating quality of at least a portion of the abstraction data based on abstraction errors inserted into one of the abstraction instances in the first batch; and h) performing steps (b)-(g) for each remaining batch of documents, wherein at least two batches of documents are processed in a parallel fashion during a pendency of the data abstraction.

\* \* \* \* \*